(12) United States Patent
Nakamura

(10) Patent No.: US 8,556,172 B2
(45) Date of Patent: Oct. 15, 2013

(54) ELECTRONIC SHELF LABEL SYSTEM AND DISPLAY METHOD

(75) Inventor: Kazutomo Nakamura, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 375 days.

(21) Appl. No.: 12/448,407

(22) PCT Filed: Sep. 1, 2008

(86) PCT No.: PCT/JP2008/065679
§ 371 (c)(1),
(2), (4) Date: Jun. 19, 2009

(87) PCT Pub. No.: WO2009/044598
PCT Pub. Date: Apr. 9, 2009

(65) Prior Publication Data
US 2010/0065634 A1 Mar. 18, 2010

(30) Foreign Application Priority Data

Oct. 5, 2007 (JP) ................. 2007-262187
Mar. 17, 2008 (JP) ................. 2008-067966

(51) Int. Cl.
*G06K 15/00* (2006.01)

(52) U.S. Cl.
USPC ........................................ 235/385

(58) Field of Classification Search
USPC ........................................ 235/385
See application file for complete search history.

(56) References Cited

U.S. PATENT DOCUMENTS 5,704,049 A 12/1997 Briechle
7,461,009 B1 * 12/2008 Haulk et al. .................... 705/20

FOREIGN PATENT DOCUMENTS

| EP | 0 713 196 A2 | 5/1996 |
| EP | 1 152 366 A2 | 11/2001 |
| JP | 4-65795 | 3/1992 |
| JP | 2004-265196 | 9/2004 |
| WO | WO 95/08795 | 3/1995 |

OTHER PUBLICATIONS

Chinese Office Action mailed Jul. 13, 2010 in application No. 2010070800390180.
International Search Report for PCT/JP2008/065679, mailed Sep. 30, 2008.
European Search Report issued by the European Patent Office on Jun. 6, 2011 in the corresponding European patent application.

(Continued)

*Primary Examiner* — Daniel Hess
(74) *Attorney, Agent, or Firm* — Staas & Halsey LLP

(57) ABSTRACT

It is an object of the present invention to perform an operation in a store on products which are not registered in a product master. In order to attain the object, an ESL server (10) includes a hard disk (14) memorizing a product master (140) and a link file (141), a bar code reader (17) and a link part (110). In associating a product with any of electronic shelf labels, an operator uses the bar code reader (17) to read out a bar code representing a product code of a product and a bar code representing a device code of an electronic shelf label located near the product. At this time, the link part (110) associates the acquired product specification information (130) with the acquired device specification information (131) to store in the link file (141) whether or not the product designated by the read out product code is registered in the product master (140).

4 Claims, 15 Drawing Sheets

(56) References Cited

OTHER PUBLICATIONS

Office Action issued by the Japanese Patent Office on Jan. 8, 2013 in the corresponding Japanese patent application No. 2008-067966.

Office Action issued by the European Patent Office on Apr. 11, 2012 in the corresponding European patent application.

* cited by examiner

| PRODUCT CODE | DEVICE CODE | |
|---|---|---|
|  |  | 141 |
| 49123401 | 12345600 | 142a |
| 49123432 | 12345673 | 142b |
| 49123456 | 12345678 | 142c |
| 49123480 | 12345695 | 142d |
| ⋮ | ⋮ |  |

142

F I G . 8
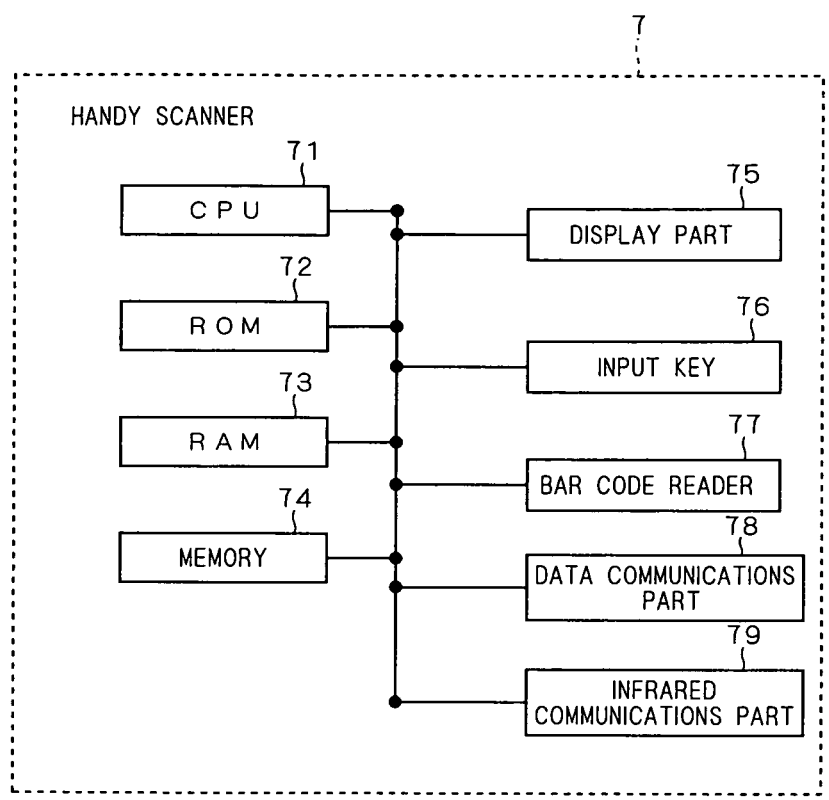

FIG. 13

| PRODUCT CODE | DEVICE CODE | |
|---|---|---|
|  |  | ~141 |
| 4 9 1 2 3 4 0 1 | 1 2 3 4 5 6 0 0 | ~142a |
| 4 9 1 2 3 4 3 2 | 1 2 3 4 5 6 7 3 | ~142b |
| 4 9 1 2 3 4 5 6 | 1 2 3 4 5 6 7 8 | ~142c |
| 4 9 1 2 3 4 8 0 | 1 2 3 4 5 6 9 5 | ~142d |
| 4 9 1 2 3 4 9 2 | 1 2 3 4 5 6 7 0 | ~142f |
| ⋮ | ⋮ | |

F I G . 1 7
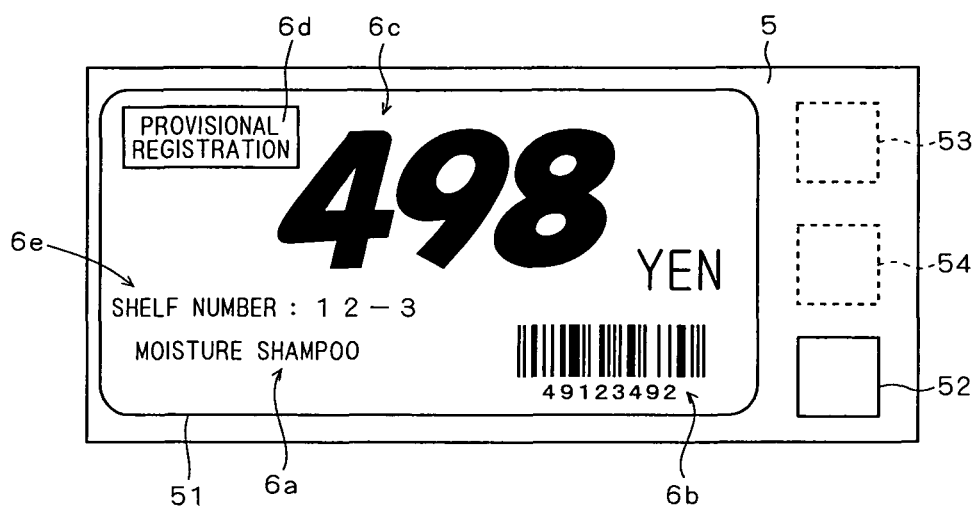

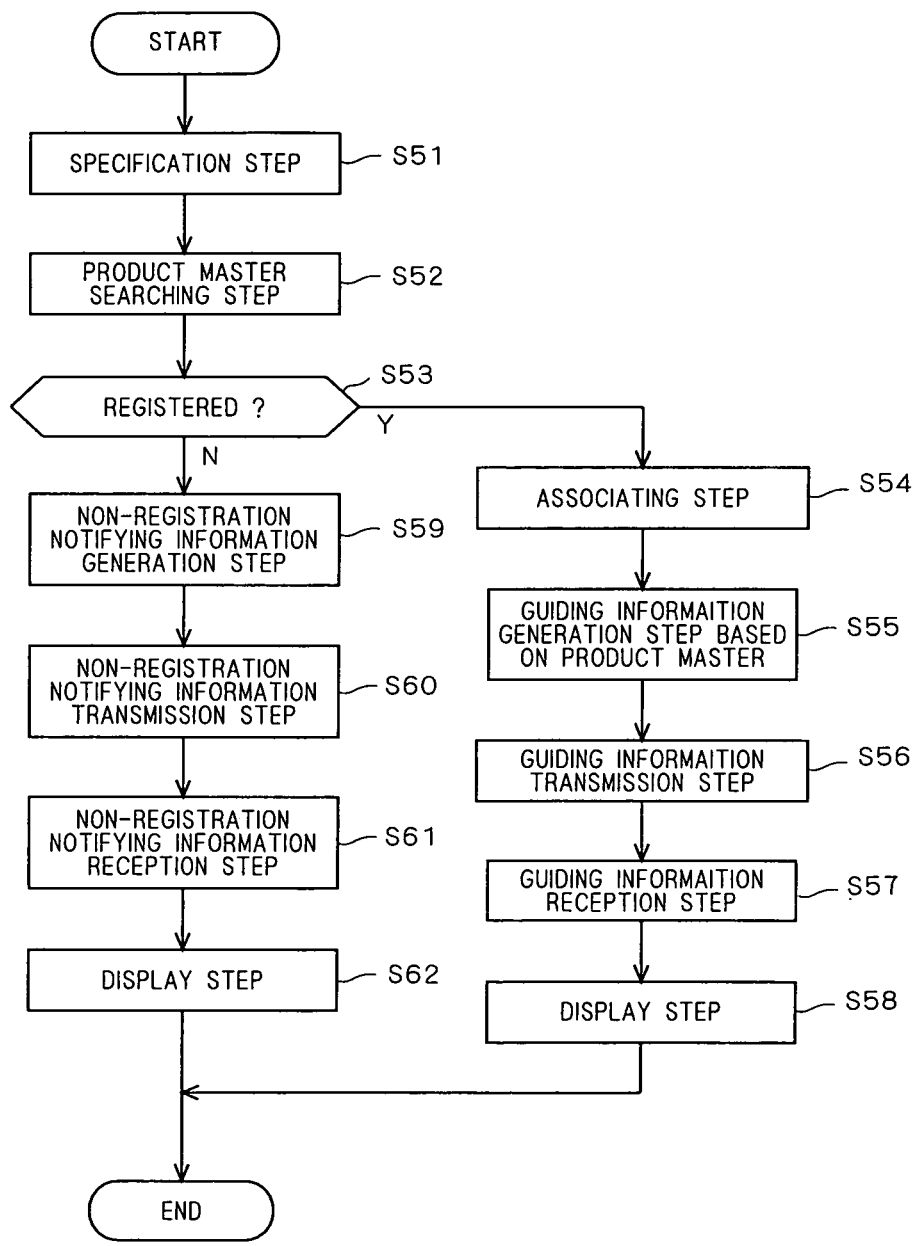
F I G . 1 8

ELECTRONIC SHELF LABEL SYSTEM AND DISPLAY METHOD

CROSS REFERENCE TO RELATED APPLICATIONS

This application claims the benefit under 35 U.S.C. Section 371, of PCT International Application No. PCT/JP2008/065679, filed Sep. 1, 2008, which claimed priority to Japanese Application Nos. 2007-262187, filed Oct. 5, 2007 and 2008-067966, filed Mar. 17, 2008, in the Japanese Patent Office, the disclosures of which are incorporated herein by reference.

TECHNICAL FIELD

The present invention relates to a technique to associate a product with an electronic shelf label which displays information regarding the product.

BACKGROUND ART

In general, in stores such as supermarkets and convenience stores, selling prices of products are under centralized control with the use of a product master stored in a point-of-sale (POS) system or the like. On the other hand, indication of selling prices to customers (consumers) is achieved by shelf labels formed of paper which are placed in respective positions of products. However, human errors such as errors in selling prices are likely to occur because shelf labels formed of papers as above can not be managed without the help of manpower. For this reason, a selling price different from that of a product master may possibly be indicated to customers.

In order to overcome the foregoing disadvantages, in recent years, an electronic shelf label system (ESL system) has been put into practical use. In an electronic shelf label system, electronic shelf labels for including display parts are placed at each position of products. Then, a selling price based on a product master is transmitted to each of the electronic shelf labels, and displayed on a display part of each of the electronic shelf labels. As a result, correct selling prices can be indicated to customers (refer to Patent document 1, for example). A server of an electronic shelf label system stores a link file in which device codes unique to respective electronic shelf labels are associated with product codes of respective products, respectively. The link file associates respective electronic shelf labels with respective products, in the form of data, so that selling prices of products can be distributed to their corresponding electronic shelf labels, respectively.

In the above-described electronic shelf label system, a process to associate respective electronic shelf labels with respective products (an associating process) is needed at the time of installation, or at a case in which change of selling products occurs. A worker performs operation for acquiring a device code and a product code at the associating process in order to generate data of the link file.

Patent document 1: Japanese Patent Application Laid-Open No. 2004-265196

However, according to the conventional method, when acquiring a product code of a product which is not registered in the product master at the associating process, information to be displayed (such as selling prices and the like) on the electronic shelf labels cannot be acquired. Therefore, in the conventional method, such a product code is determined to be input failure, and the associating process is not performed. Namely, the associating process cannot be performed in a store until receiving the final product master from a head office, causing delay in layout of products.

In a selling floor where products and electronic shelf labels are placed, workers cannot learn that products that are targets of the associating process are not registered in the product master. Accordingly, workers cannot update the product master by themselves, and also cannot prompt the head office managing each store to update the product master, resulting in the situation where update of the product master is not performed immediately.

DISCLOSURE OF INVENTION

The present invention has been made in view of the foregoing problems, and it is the first object of the present invention to perform an operation in a store regarding products that are not registered in the product master.

Furthermore, it is the second object of the present invention to provide techniques for notifying workers that products which are targets of the associating process are not registered in the product master.

In order to solve the above-described problems, the first aspect of an electronic shelf label system for displaying guiding information of a product according to the present invention includes: electronic shelf labels located near products, a storage part for memorizing a product master which stores information regarding registered products, an input part for accepting provisional information, a specifying part for specifying a product and an electronic shelf label located near the product, a link part for associating a product specified by the specifying part with an electronic shelf label located near the product, a generation part for generating guiding information of a product specified by the specifying part based on provisional information accepted by the input part when the product is not registered in a product master memorized in the storage part, while generating guiding information of the product based on the product master when the product is registered in the product master, and a transmission part for transmitting guiding information of a product to an electronic shelf label associated with the product when guiding information of the product is generated, wherein an electronic shelf label which has received guiding information from the transmission part displays the guiding information.

The second aspect of the electronic shelf label system according to the present invention is the first aspect wherein when guiding information of a product is generated by the generation part based on provisional information accepted by the input part, the content of the provisional information of the product is reflected on the product master memorized in the storage part.

The third aspect of the electronic shelf label system according to the present invention is the first and second aspects, further including an update part for updating the product master memorized in the storage part regarding a product which is a target of update, wherein when a product which is a target of update has been already associated with any of electronic shelf labels, the generation part generates guiding information of the product based on the product master updated by the update part.

The fourth aspect of the electronic shelf label system according to the present invention is any of the first through three aspects wherein when generating guiding information based on provisional information, the generation part includes identification information showing that the guiding information is generated based on the provisional information.

A display method for displaying guiding information of a product according to the present invention includes the steps of: (a) acquiring a product master which stores information regarding registered products and memorizing the product master in a storage part, (b) specifying a product and an electronic shelf label located near the product, (c) associating the product specified in the step (b) with the electronic shelf label located near the product, (d) determining whether or not the product specified in the step (b) is registered in the product master, (e) generating guiding information of the product based on the product master when the product is determined to be registered in the product master in the step (d), (f) acquiring provisional information of the product and generating guiding information of the product based on the acquired provisional information when the product is determined not to be registered in the product master in the step (d), (g) transmitting guiding information of the product to an electronic shelf label associated with the product when guiding information of the product is generated, (h) displaying guiding information of the product received by the electronic shelf label on the electronic shelf label.

The fifth aspect of an electronic shelf label system for displaying guiding information of a product according to the present invention includes: electronic shelf labels located near products, a transportable information processing device including a specifying part for specifying a product and an electronic shelf label located near the product, a storage part for memorizing a product master which stores information regarding registered products, a link part for associating a product specified by the specifying part with an electronic shelf label located near the product when the product is registered in the product master, a generation part for generating non-registration notifying information for notifying that the product specified by the specifying part is not registered in the product master when the product is not registered in the product master, while generating guiding information of a product specified by the specifying part based on the product master when the product is registered in the product master, and a transmission part for transmitting non-registration notifying information of a product to an electronic shelf label located near the product when non-registration notifying information of the product is generated, while transmitting guiding information of a product to an electronic shelf label associated with the product when guiding information of the product is generated, wherein an electronic shelf label which has received guiding information of the product from the transmission part displays the guiding information, and the electronic shelf label which has received non-registration notifying information regarding a product from the transmission part displays that the product is not registered in the product master.

The sixth aspect of the electronic shelf label system according to the present invention is the fifth aspect wherein even when a product specified by the specifying part is not registered in the product master, the link part associates the product with an electronic shelf label located near the product.

According to the first through the fourth aspects of the electronic shelf label system and the display method of the present invention, while guiding information of a product specified by the specified part is generated based on the product master when the product is registered in the product master, in addition to associate the product specified by the specifying part with an electronic shelf label located near the product, even a product which is not registered in the product master can be associated with an electronic shelf label by generating guiding information of the product based on the accepted provisional information when the product is not registered in the product master. Therefore, it is unnecessary to wait for acquiring the final product master, and display of products can be preceded in a store, for example.

According to the second aspect of the electronic shelf label system of the present invention, when guiding information of a product is generated by the generation part based on provisional information accepted by the input part, the provisional information of the product displayed on the electronic shelf label as guiding information can be matched to information of the product master by reflecting the content of the provisional information of the product on the product master memorized in the storage part.

According to the third aspect of the electronic shelf label system of the present invention, in a case that a product which is a target of update has been already associated with any of the electronic shelf labels, guiding information of the product is generated based on the product master updated by an update part so that display of the electronic shelf label with which the product has been already associated can be automatically changed based on the updated product master when the product master is updated. Therefore, it is unnecessary for an operator to give further instruction to rewrite guiding information, thus reducing the operator's burden.

According to the fourth aspect of the electronic shelf label system of the present invention, when guiding information is generated based on provisional information, identification information for showing that the guiding information is generated based on the provisional information is included in the guiding information to display as the guiding information on an electronic shelf label that the guiding information is based on the provisional information so that it can be easily confirmed that information regarding the product displayed on the electronic shelf label is not based on the final product master.

According to the fifth and sixth aspects of the electronic shelf label system of the present invention, in a case that a transportable information processing device specifies a product and an electronic shelf label which are associated with each other, when the product is not registered in the product master, an electronic shelf label located near the product displays accordingly. Therefore, when specifying a product and an electronic shelf label which are associated with each other, using the transportable information processing device in a floor where the product and the electronic shelf label are placed, a worker can be notified that the product is not registered in the product master. Accordingly, update of the product master can be performed promptly.

According to the sixth aspect of the electronic shelf label system of the present invention, even when a product specified by the information processing device is not registered in the product master, the product is associated with any of the electronic shelf labels located near the product so that a worker can associate the product with the electronic shelf label without waiting for update of the product master. Thus, working efficiency is enhanced.

These and other objects, features, aspects and advantages of the present invention will become more apparent from the following detailed description of the present invention when taken in conjunction with the accompanying drawings.

BRIEF DESCRIPTIONS OF DRAWINGS

FIG. 8 is a view for showing a schematic structure of a handy scanner.

FIG. 13 is a view for showing an example of a link file.

FIG. 17 is a view for showing an example in which guiding information generated based on provisional information is displayed on the electronic shelf label.

FIG. 18 is a flow chart for showing operations in the associating process after installation of an electronic shelf label system according to the second preferred embodiment of the present invention.

BEST MODE FOR CARRYING OUT THE INVENTION

Hereinafter, preferred embodiments of the present invention will be discussed with reference to accompanying drawings.

First Preferred Embodiment

Figure 1:
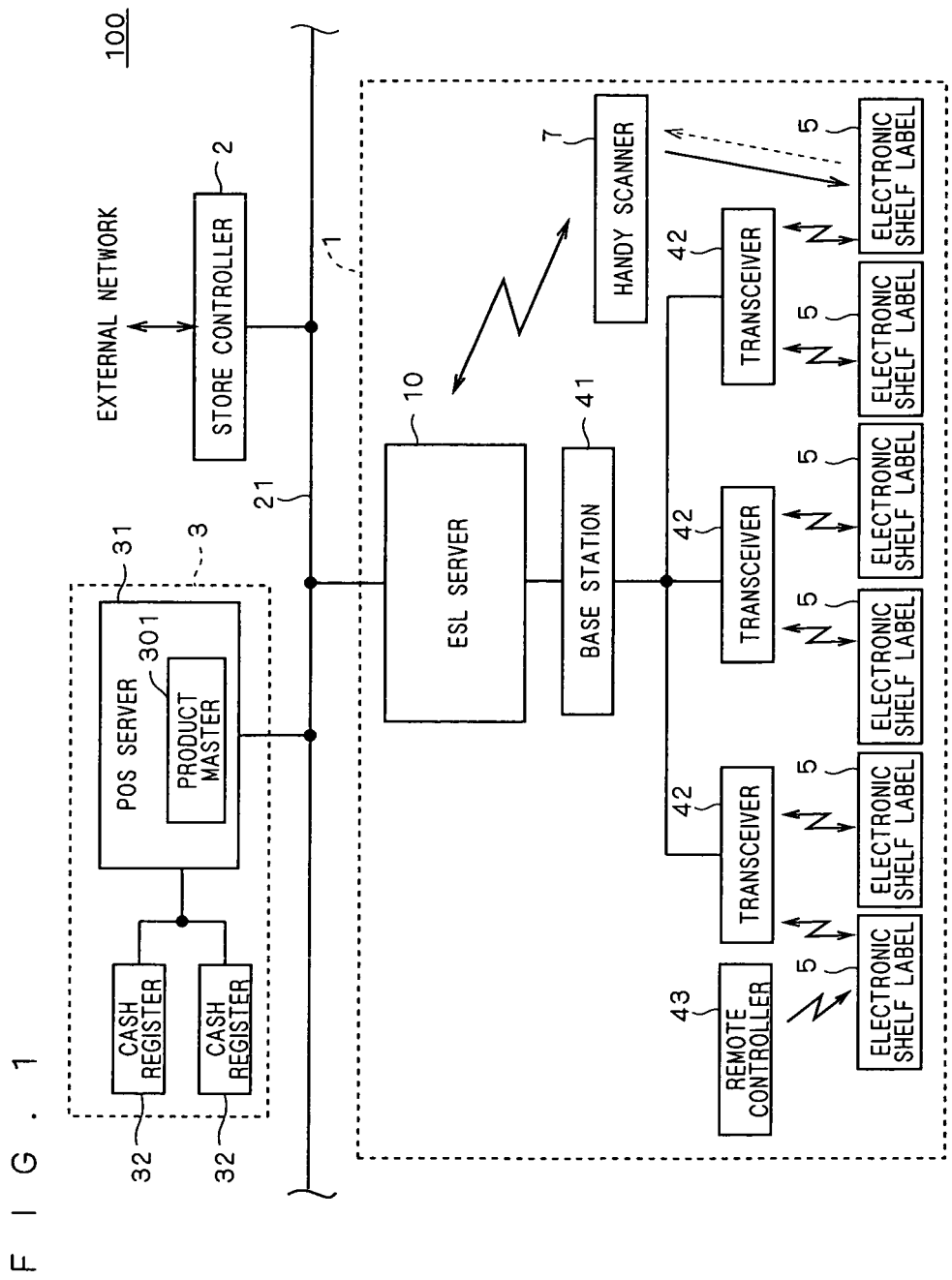
FIG. 1 is a view for showing an example of a structure of a store information system including an electronic shelf label system according to the first preferred embodiment of the present invention.

FIG. 1 is a view for showing an example of a structure of a store information system 100 including an electronic shelf label system 1 according to the present invention. Further, FIG. 2 is a view for showing a state in which electronic shelf labels 5 included in the electronic shelf label system 1 are located in a shelf 60.

Figure 2:
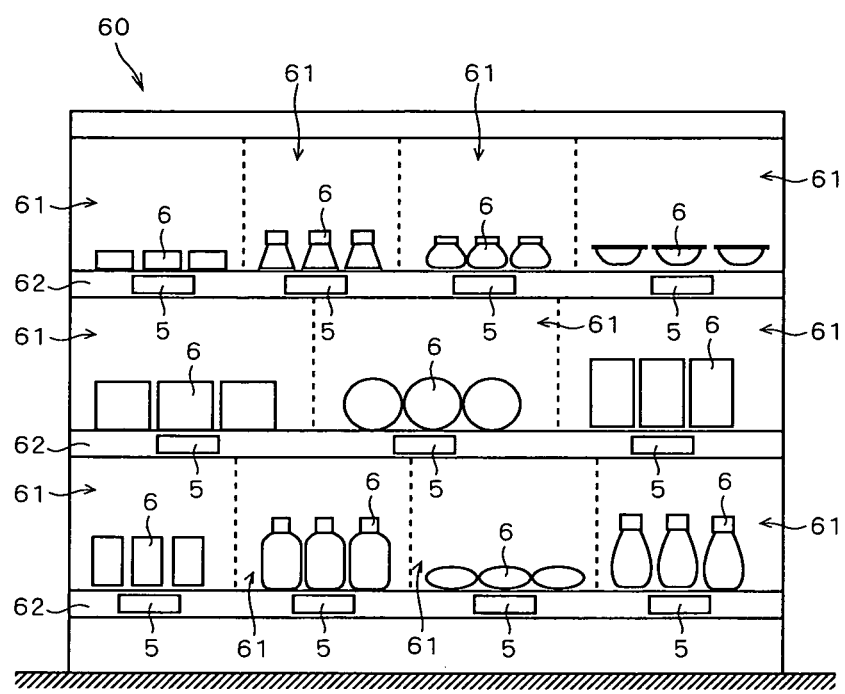
FIG. 2 is a view for showing a state in which electronic shelf labels included in the electronic shelf label system according to the first preferred embodiment of the present invention are located in shelves of a store.

As shown in FIG. 2, the shelf 60 is partitioned into spaces each of which is called a face 61, where the same kinds of products 6 are gathered and placed. That is, each of the faces 61 is physically associated with a single product 6 placed thereon, respectively. Each of the products 6 is provided with a bar code indicating a product code which serves as product identification information for identifying the kind of product, with the use of a label or by printing. It is noted that the product code is not limited to a bar code but may be designated by a QR code or the like, for example.

Onto frames 62 of the shelf 60, the electronic shelf labels 5 are attached in positions respectively corresponding to the faces 61. That is, each of the electronic shelf labels 5 is associated with a single product 6, and is located at a position near the product 6 with which each of the electronic shelf labels 5 is associated. That is, by attaching the electronic shelf label 5 to a predetermined position of the frame 62, the electronic shelf label 5 is physically associated with the products 6 placed on the face 61 corresponding to a position where the electronic shelf label 5 is attached.

Although details will be described below, each of the electronic shelf labels 5 includes a display part, and the display part displays guiding information 133 (FIG. 5) including information such as a selling price of the corresponding product 6 or the like, thereby a selling price of the product 6 is shown to customers.

According to the preferred embodiment of the present invention, a plurality of shelves configured like the shelf 60 as shown in FIG. 2 are placed on a selling floor of a store. When locations or the like of the products 6 are changed, positions or sizes of the faces 61 are accordingly changed. In order to keep up with such changes of the faces 61, the electronic shelf labels 5 must not be fixed, and instead, the electronic shelf labels 5 can be detached from the frames 62 to be relocated in different positions.

As shown in FIG. 1, the store information system 100 includes a store controller 2 and a POS system 3, in addition to the electronic shelf label system 1. An ESL server 10 included in the electronic shelf label system 1 and a POS server 31 included in the POS system 3 are connected to the store controller 2 via a LAN 21. This allows data communication among the store controller 2, the POS system 3, and the electronic shelf label system 1.

The store controller 2 is formed of a typical computer, and functions as a device which totally controls the store information system 100. Also, the store controller 2 is connected to an external network such as Internet, and is allowed to communicate with computers or the like, which are installed in a head office that manages a store, via an external network.

The POS system 3 is a system which collects and analyzes information regarding sale of each of products 6. The POS system 3 includes a plurality of cash registers 32 for performing checkout procedures of products 6, in addition to the POS server 31 which totally controls the POS system 3. The POS server 31 is formed of a typical computer, and contains a hard disk in which a product master 301 indicating various information such as "product codes", "product names" and "selling prices" of products 6 is stored.

Selling prices of products 6 in a store are under centralized control with the use of the product master 301. In each of the plurality of cash registers 32, checkout procedures of products are performed based on selling prices listed in the product master 301. Selling prices listed in the product master 301 can be changed in accordance with instructions given from the computers in the head office (information received by the store controller 2), or through direct operations performed on the POS server 31.

The electronic shelf label system 1 includes a remote controller 43, an ESL server 10, a plurality of electronic shelf labels 5 and a handy scanner 7, in addition to a base station 41 and a plurality of transceivers 42. It is noted that FIG. 1 shows only one remote controller 43 and handy scanner 7, but the electronic shelf label system 1 may include a plurality of remote controllers 43 and handy scanners 7.

The base station 41 is connected to the ESL server 10 and each of the transceivers 42, and functions as a relay of a signal between the ESL server 10 and each of the transceivers 42.

Each of the transceivers 42 transmits an infrared signal to the electronic shelf labels 5. Plurality of the transceivers 42 are placed on a ceiling of a selling floor and the like at substantially regular intervals so that the ESL server 10 can communicate with all the electronic shelf labels 5 located in the selling floor of a store.

The remote controller 43 carried by a worker transmits an infrared signal to the electronic shelf labels 5 as well as the transceivers 42, and primarily serves for switching a screen displayed on the electronic shelf label 5.

Figures 3, 4:
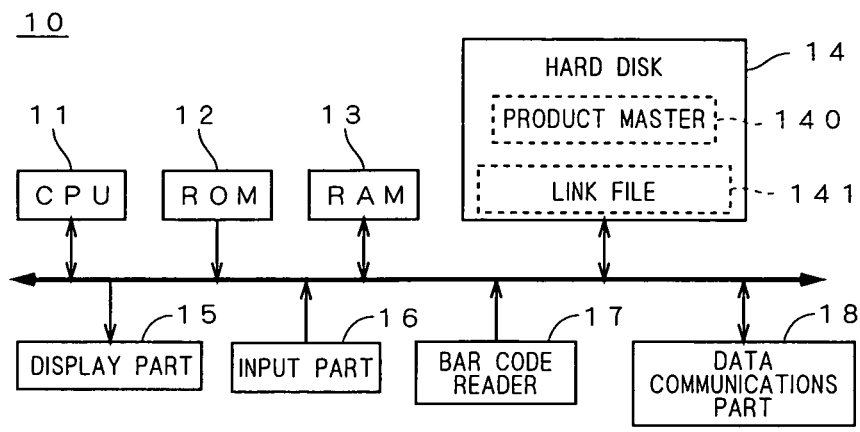
FIG. 3 is a view for showing a basic structure of an ESL server.
FIG. 4 is a view for showing an example of a link file.

FIG. 3 is a view for showing a structure of the ESL server 10. The ESL server 10 is a server which totally controls the electronic shelf label system 1, and is normally installed in a separate room such as a backyard, which is distinct from a selling floor of a store.

A structure of the ESL server 10 as a hardware is similar to that of a typical computer. The ESL server 10 includes a CPU 11 which performs various computations, a ROM 12 which stores a basic program, a RAM 13 serving as a workspace of computations, a hard disk 14 which stores programs, various data files, and the like, a display part 15 which displays a variety of information, an input part 16 which includes a keyboard, a mouse, and the like, a bar code reader 17 for reading out a bar code, and a data communications part 18.

A dedicated program (not shown) is previously stored in the hard disk 14 of the ESL server 10, and the CPU 11 performs computations in accordance with the dedicated program, so that various functions of the ESL server 10 are implemented. Also, the hard disk 14 of the ESL server 10 stores a product master 140 and a link file 141.

Figure 5:
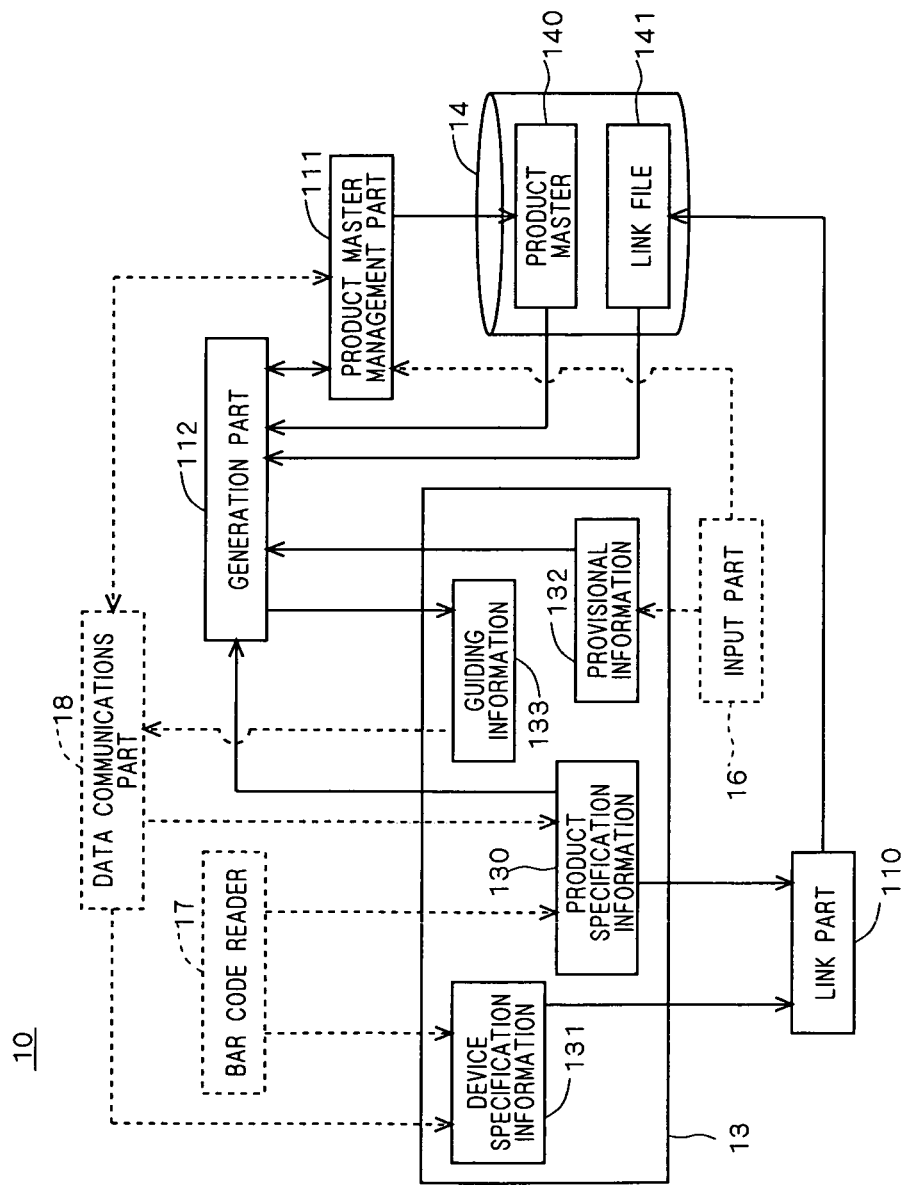
FIG. 5 is a view for showing a functional block included in the ESL server with flow of data.

The product master 140 is a data file indicating a variety of information regarding products 6, which is mainly used for generating guiding information 133 displayed on the electronic shelf labels 5. More specifically, the product master 140 is in tabular form, in which a single record indicates information regarding a single kind of product, and a "product code", a "product name", a "selling price", a "sales figure", an "order figure", "bargain time", "bargain period", "provisional information identifier" and the like are stored for each record. It is noted that provisional information identifier is identification information for indicating that information stored in the record is based on provision information 132 (FIG. 5).

In the electronic shelf label system 1 according to the present first preferred embodiment, data which is identical to that of the product master 301 stored in the POS server 31 is used as the product master 140. That is, if either the product master 140 or the product master 301 is updated, updated information is transmitted from the one which is updated to the other. According to this, data communication is performed between the ESL server 10 and the POS server 31 so that the other is similarly updated, and thereby data of the product master 140 and data of the product master 301 match each other in the store information system 100.

It is noted that the product master may be stored in only one of the ESL server 10, the POS server 31 or the store controller 2 to be referred from other servers if needed. Further, items provided in the product master 140 and the product master 301 may be not necessarily identical to each other. For example, information items ("provisional information identifier", e.g.) which are necessary only for the electronic shelf label system 1 are provided only in the product master 140, and it is unnecessary to provide such information items in the product master 301 used in the POS system 3.

FIG. 4 is a view for showing an example of the link file 141. The link file 141 is a data file associating the electronic shelf labels 5 with products 6 in the form of data (logically). As shown in FIG. 4, the link file 141 is in tabular form, and each of records 142 serves as link information associating a product code with a device code. It is noted that a device code is hardware ID (hardware identification information) which is unique to each of a plurality of the electronic shelf labels 5 included in the electronic shelf label system 1. The provision of the link file 141 allows the electronic shelf labels 5 and the products 6 to respectively associate with each other, logically.

When the ESL server 10 transmits information regarding a certain product 6 to the electronic shelf label 5, a device code associated with a product code of the product 6 is specified with reference to the link file 141. Then, an infrared signal including this device code is transmitted from the transceiver 42 so that information of the product 6 is transmitted only to the electronic shelf label 5 (i.e. the electronic shelf label 5 associated with the product 6) including the device code.

Returning to FIG. 3, the bar code reader 17 has a function to read out a device code of the electronic shelf label 5 or a product code of the product 6 and to transfer whichever to the RAM 13.

The data communications part 18 has not only a wired data communications function using the LAN 21, but also a data communications function using a wireless LAN. As a result, the ESL server 10 is allowed to transmit and receive data to/from the store controller 2 and the POS server 31, and to further transmit and receive data to/from the handy scanner 7 having a data communications function using a wireless LAN, by radio communication.

Furthermore, the data communications part 18 has a data communications function with the base station 41, and various signals controlling the electronic shelf labels 5 are transmitted from the data communications part 18 through the base station 41. Specifically, when the CPU 11 generates guiding information 133 of a product 6, the data communications part 18 transmits guiding information 133 of the product 6 to the electronic shelf label 5 associated with the product 6.

A link part 110, a product master management part 111 and a generation part 112 shown in FIG. 5 are a functional block implemented by mainly the CPU 11 operating in accordance with a program.

A product specification information 130 is a product code (product identification information) identifying a product 6 specified for performing the associating process, and a device specification information 131 is a device code (identification information) identifying an electronic shelf label 5 specified for performing the associating process. The present first preferred embodiment describes a case where the product specification information 130 and the device specification information 131 are acquired by the bar code reader 17 reading out a bar code, and a case where the product specification information 130 and the device specification information 131 are acquired by the data communications part 18 receiving them. It is noted that the product specification information 130 and the device specification information 131 may be input and acquired by the way of which an operator of the ESL server 10 operates the input part 16, which is not shown in FIG. 5.

The link part 110 newly generates a single record 142 of the link file 141 based on the product specification information 130 and the device specification information 131 when they are acquired, and registers the single record 142 in the link file 141 memorized in the hard disk 14. That is, the link part 110 generates (updates) the link file 141 by logically associating a product code included in the acquired product specification information 130 with a device code included in the acquired device specification information 131 so that a product 6 specified by the product code and an electronic shelf label 5 specified by the device code are associated with each other.

The product master management part 111 has functions to register new products 6 in the product master 140 memorized in the hard disk 14 and to update information regarding registered products 6. More specifically, the product master management part 111 has functions to update the product master 140 based on updated information transmitted from the input part 16 or updated information received by the data communications part 18, and to reflect the content of provisional information 132 transmitted through the generation part 112 on the product master 140.

It is noted that updated information received by the data communications part 18 is information acquired from outside of the electronic shelf label system 1. Giving specific examples, there is information that the product master 301 transmitted from the POS server 31 is updated, or information for instructing to update a product master which is received by the store controller 2 from the head office and is transferred to the ESL server 10.

When updating the product master 140 based on updated information transmitted from the input part 16, or when reflecting the content of provisional information 132 on the product master 140, the product master management part 111 transmits the updated information or the provisional information 132 to the data communications part 18 which sends those information toward the POS server 31. As a result, the product master 301 is updated by the POS server 31 so that data of the product master 140 and that of the product master 301 match each other as described above.

Furthermore, when updating the product master 140 based on updated information, the product master management part 111 transmits a product code showing updated product (a product which is a target of update) to the generation part 112.

The generation part 112 generates guiding information 133 regarding the specified product 6. According to the present first preferred embodiment, specification of a product 6 for the generation part 112 includes a specification by a product code included in the product specification information 130 and a specification by a product code transmitted from the product master management part 111. Detailed operations of the generation part 112 will be described later.

Figure 6:
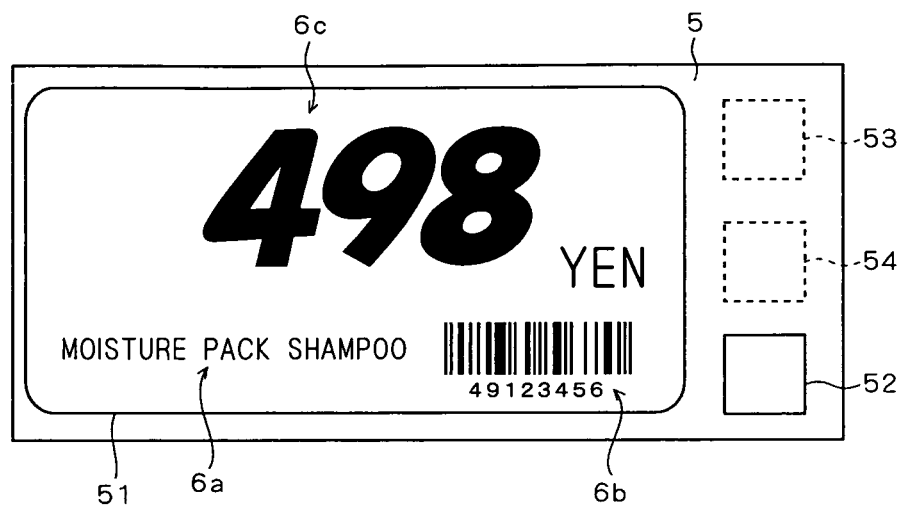
FIG. 6 is a front view of an electronic shelf label.

FIG. 6 is a front view (a view visually possible in a state where the electronic shelf label 5 is attached to the shelf 60) of the electronic shelf label 5. As shown in FIG. 6, the electronic shelf label 5 includes a display part 51 for displaying guiding information 133 and an infrared communications part 52 for receiving an infrared signal at its front.

The display part 51 is formed of a liquid crystal display part of a dot matrix type which is able to display not only numerical values, but also a variety of information such as characters, symbols, and graphics. Specifically, the display part 51 according to the present first preferred embodiment displays information included in guiding information 133 received by the electronic shelf label 5 as described above. It is noted that information displayed on the display part 51 is not limited to information derived from guiding information 133.

In the example shown in FIG. 6, a selling price 6c of a product 6 is displayed on the display part 51 as well as a product name 6a and a bar code 6b (to be precise, a bar code showing a product code), which are information (which will be hereinafter referred to as "product identification information") possible to specify the product 6 associated with its own device, based on information included in guiding information 133. If product identification information is not displayed on the display part 51, but only a selling price 6c is displayed, it is difficult to find out which product 6 is associated with the electronic shelf label 5. However, such a display of product identification information visually allows the electronic shelf label 5 to be associated with the product 6.

The electronic shelf label 5 internally includes a control part 53 formed of a microcomputer or the like, and a memory 54 for memorizing various information. The memory 54 memorizes information to be displayed on the display part 51 (may be represented by any of character data, numerical data or image data) and a device code of its own device. Guiding information 133 sent from the transceivers 42 as an infrared signal is received by the infrared communications part 52, once memorized in the memory 54, and then displayed on the display part 51 by control of the control part 53.

The electronic shelf label 5 is able to switch information displayed on the display part 51, and also able to display information or the like previously stored in the memory 54 as well as information (selling prices, product names, product codes, sales figures, order figures, bargain time, bargain period or the like) included in guiding information 133 of the associated product 6. It is possible to switch information displayed on the display part 51 in accordance with an infrared signal received by the infrared communications part 52. The remote controller 43 and the handy scanner 7 which are transportable and possible to send a plurality of infrared signals corresponding information displayed by the electronic shelf label 5 are used for such a switching operation of information (referring to FIG. 1). That is, the display part 51 according to the present first preferred embodiment does not need to display all the information included in guiding information 133 at one time, but may display selectively by such a switching operation.

A device code of its own device is included in information displayed by the electronic shelf label 5 by switching display of the display part 51. Receiving an infrared signal (which will be hereinafter referred to as a "code display signal") corresponding to display of a device code in the infrared communications part 52, the electronic shelf label 5 displays a device code of its own device.

Figure 7:
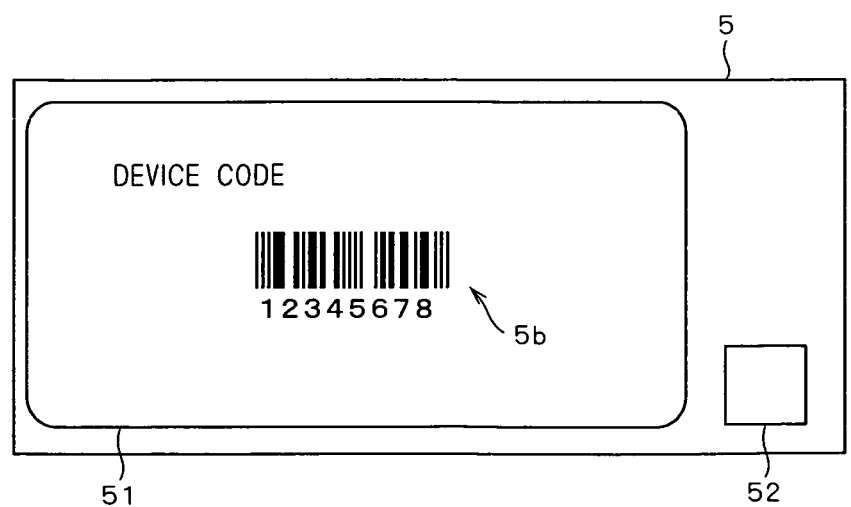
FIG. 7 is a view for showing an example of the electronic shelf label displaying a device code of its own device.

FIG. 7 is a view for showing an example of the electronic shelf label 5 displaying a device code 5b of its own device. As shown in FIG. 7, the device code 5b is displayed as an image representing a bar code on the display part 51. It is noted that if the electronic shelf label 5 does not have a function to display a device code 5b of its own device, a label printed with a device code 5b of its own device in a bar code is attached to the electronic shelf label 5.

FIG. 8 is a view for showing a schematic structure of the handy scanner 7. Although details will be described later, the handy scanner 7 is used by a worker to instruct the electronic shelf label system 1 to associate a product 6 with an electronic shelf label 5 located near the product 6 in mainly a selling floor of a store. It is noted that the present first preferred embodiment would be described by giving an example of the handy scanner 7 configured as a dedicated device. However, transportable computers which are generally used such as laptop computers, PDA or the like to which a bar code reader is connected may be adopted for configuration as an information acquisition terminal device corresponding to the handy scanner 7.

As shown in FIG. 8, the handy scanner 7 includes a CPU 71 which performs various computations, a ROM 72 which stores a basic program, a RAM 73 serving as a workspace of computations, and a non-volatile memory 74 which stores programs, various data files or the like. Also, the handy scanner 7 includes a display part 75 which displays a variety of information, an input key 76 which accepts input from a worker, a bar code reader 77 for acquiring information shown by a bar code, and a data communications part 78 which has a data communications function by radio communication using a wireless LAN, and an infrared communications part 79.

A function of the data communications part 78 allows the handy scanner 7 to transmit and receive data to/from the ESL server 10 (the data communications part 18) by radio communication. As a result, the handy scanner 7 is able to send a bar code 6b (a product code) and a bar code 5b (a device code), which are acquired by the bar code reader 17 reading out a bar code, toward the data communications part 18.

The product code 6b received by the data communications part 18 of the ESL server 10 is transferred to the RAM 13 of the ESL server 10 as product identification information 130, and the device code 5b is transferred to the RAM 13 of the ESL server 10 as device identification information 131 (FIG. 5). That is, reading out the bar codes 6b and 5b with the bar code reader 77 of the handy scanner 7 corresponds to specifying a product 6 shown by the bar code 6b and an electronic shelf label 5 shown by the bar code 5b.

Moreover, a function of the infrared communications part 79 allows the handy scanner 7 to send various infrared signals to the infrared communications part 52 of the electronic shelf label 5. Specifically, the infrared communications part 79 has a function to send a code display signal to the electronic shelf label 5. Accordingly, the handy scanner 7 is allowed to acquire a device code of the electronic shelf label 5 with the bar code reader 77 reading out the displayed bar code 5b, after the bar code 5b representing the device code of the electronic shelf label 5 is displayed.

The foregoing is the description of configurations and functions of the electronic shelf label system 1 according to the present first preferred embodiment. Next, a display method for displaying guiding information 133 of a product 6 will be discussed.

Figure 9:
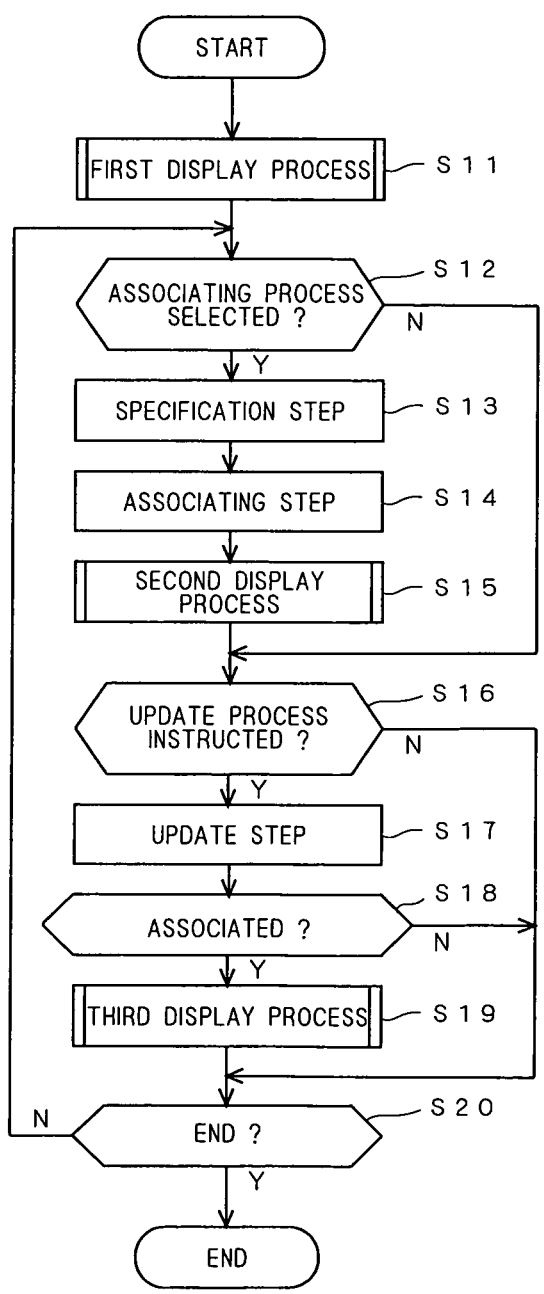
FIG. 9 is a flow chart for showing a method of displaying guiding information of a product using the electronic shelf label system according to the first preferred embodiment of the present invention.

FIG. 9 is a flow chart for showing a method of displaying guiding information 133 of a product 6 using the electronic shelf label system 1.

First, an operator starts up the electronic shelf label system 1 to implement a first display process (a step S11). It is noted that the first display process is a process implemented automatically by the electronic shelf label system 1 when the power to the electronic shelf label system 1 turns ON and a process for performing display of an initial state based on the product master 140 and the link file 141 previously stored in the hard disk 14 at start-up. In other words, it is a process for recovering a display state of the electronic shelf label system 1 when the electronic shelf label system 1 is shut down.

Figure 10:
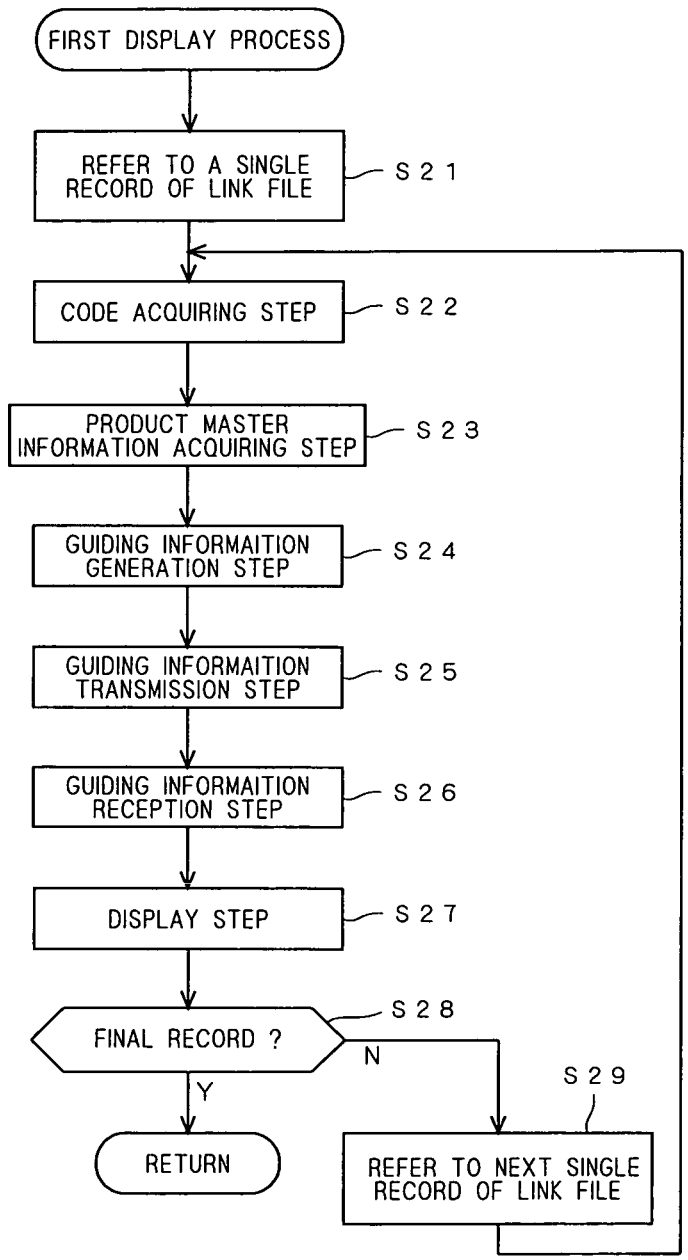
FIG. 10 is a flow chart for showing a first display process implemented by the electronic shelf label system according to the first preferred embodiment of the present invention.

FIG. 10 is a flow chart for showing the first display process implemented by the electronic shelf label system 1.

When the first display process is started by the electronic shelf label system 1, a single record 142 (e.g. a record 142 at the head) of the link file 141 is referred to by the generation part 112 of the ESL server 10 (a step S21), and a product code regarding a single product 6 and a device code associated with the product code are acquired from the referred single record 142 (a step S22). It is noted that this corresponds to the case where the link file 141 specifies a product code of a product 6 to generate guiding information 133 for the generation part 112.

Next, the generation part 112 refers to the product master 140 based on the acquired (specified) product code, and acquires information (information regarding a product 6 which the product code shows) associated with the product code in the product master 140 (a step S23).

In the present first preferred embodiment, all the information of a single record in the product master 140 is acquired in the step S23. However, it may be so configured as not to acquire all the information of a single record, but to acquire only the necessary information included in the single record.

Although details will be discussed later, according to the electronic shelf label system 1 of the present first preferred embodiment, when performing the associating process of a product 6 which is not registered in the product master 140, the product 6 is registered in the product master 140 based on provisional information 132. In other words, the product 6 which is already associated in the link file 141 is configured to be registered in the product master without fail. Accordingly, the electronic shelf label system 1 of the present first preferred embodiment can acquire a single record from the product master 140 based on the product code acquired from the link file 141 without fail.

Next, the generation part 112 generates guiding information 133 based on a device code acquired in the step S22 and a single record of the product master 140 acquired in the step S23 (a step S24). That is, the guiding information 133 is generated by the generation part 112 based on the product master 140.

After the guiding information 133 is generated, the data communications part 18 refers to the generated guiding information 133, and then, in accordance with the device code included in the guiding information 133, transmits the guiding information 133 toward the electronic shelf label 5 designated by the device code (a step S25).

The corresponding electronic shelf label 5 receives the guiding information 133 transmitted in the step S25 (a step S26), and subsequently, the electronic shelf label 5 (the control part 53) appropriately displays information included in the received guiding information 133 (a step S27).

Next, the ESL server 10 determines whether or not a single record 142 of the link file 141 to which is referred at the moment is the final record of the link file 141 (a step S28), and then, refers to next single record 142 of the link file 141 when it is not the final record (a step S29) and repeats the process from the step S22. As a result, all the records 142 of the link file 141 are sequentially referred to. On the other hand, when a single record 142 of the link file 141 to which is referred is the final record, the electronic shelf label 5 terminates the first display process.

As discussed above, with respect to all the products 6 associated with the electronic shelf labels 5 in the link file 141, the guiding information 133 is transmitted to the electronic shelf labels 5, which are associated with the products 6, and is displayed thereon.

Now that the first display process will be more specifically described, giving an example where the electronic shelf label system 1 is started up with a state in which the link file 141 shown in FIG. 4 is memorized in the hard disk 14.

If the steps S21 to S29 are sequentially implemented, and a record 142c is referred to in the step S29, a product code "49123456" and a device code "12345678" associated therewith are acquired from the record 142c in the step S22.

In the step S23, the product master 140 is searched based on the product code "49123456", and a single record storing the product code "49123456" is referred to. Subsequently, the generation part 112 acquires the product code "49123456", a product name "moisture pack shampoo", a selling price "498" or the like as information stored in the single record.

Next, the step S24 is implemented, and then, the generation part 112 generates the guiding information 133 including information such as the device code "12345678", the product code "49123456", the product name "moisture pack shampoo", and the selling price "498". Subsequently, in the step S25, the data communications part 18 refers to the device code "12345678" included in the guiding information 133, and the guiding information 133 is transmitted to the electronic shelf label 5 represented by the device code "12345678".

In the step S26, the electronic shelf label 5 with the device code "12345678" (the electronic shelf label 5 shown in FIG. 7) receives the guiding information 133 transmitted in the step S25, and displays the guiding information 133 in the step S27.

Herewith, as shown in FIG. 6, the product name "moisture pack shampoo" is displayed as a product name 6a, the product code "49123456" is displayed as a bar code 6b, and the selling price "498" is displayed as a selling price 6c. That is, information regarding the product 6 stored in the product master 140 is displayed.

The foregoing is the description of the first display process in the step S11.

Returning to FIG. 9, when the first display process shown in the step S11 is finished, the electronic shelf label system 1 enters into a stand-by state. During stand-by, the electronic shelf label system 1 observes whether an operator (a worker) chooses the associating process (a step S12), or whether a process to update the product master 140 is instructed (a step S16).

When an operator of the ESL server 10 desires the associating process to associate a newly arrived product 6 with an electronic shelf label 5 located near the product 6, the operator operates the input part 16 of the ESL server 10 and inputs an instruction to choose the associating process to the electronic shelf label system 1. The ESL server 10 is generally installed in a backyard of a store. That is, the process by the operator is performed not in the selling floor in which the shelves 60 are placed, but in the backyard. Accordingly, the electronic shelf label 5 at hand of the operator has not yet been attached to the shelf 60, and is brought into the selling floor after being associated with the product 6, and then attached to a predetermined place of the frame 62 corresponding to the face 61 on which the product 6 is placed on the shelf 60. The associating process by the operator using the ESL server 10 as in the above is referred to as an "associating process before installation" in the description hereinafter.

Meanwhile, when a worker having the handy scanner 7 desires to perform the similar associating process, the worker operates an input key 76 of the handy scanner 7 and inputs an instruction to choose the associating process to the electronic shelf label system 1. Since the handy scanner 7 is a transportable device, it is made possible to instruct the associating process not only in the backyard, but also in the selling floor in which the shelves 60 are placed, by configuring to input an instruction from the handy scanner 7. That is, the associating process can be performed with the electronic shelf label 5 being attached to the shelf 60 so that errors occurring when attaching the electronic shelf label 5 can be reduced, compared to a case in which the electronic shelf label 5 is attached after the associating process. The associating process by the worker using the handy scanner 7 as in the above is referred to as an "associating process after installation" in the description hereinafter. It is noted that the associating process after installation does not necessarily mean to be strictly limited to the process performed after attaching the electronic shelf label 5 to the shelf 60, but the process may be performed just before attaching the electronic shelf label 5, for example. The "associating process after installation" referred here means the associating process performed by operating the handy scanner 7 eventually.

With receipt of an instruction to choose the associating process (the associating process before installation or the associating process after installation), the electronic shelf label system 1 determines yes in the step S12, and shifts itself to a specification waiting state to accept a specification of a product 6 to be subjected to the associating process and a specification of an electronic shelf label 5 to be associated with the product 6.

Figure 11:
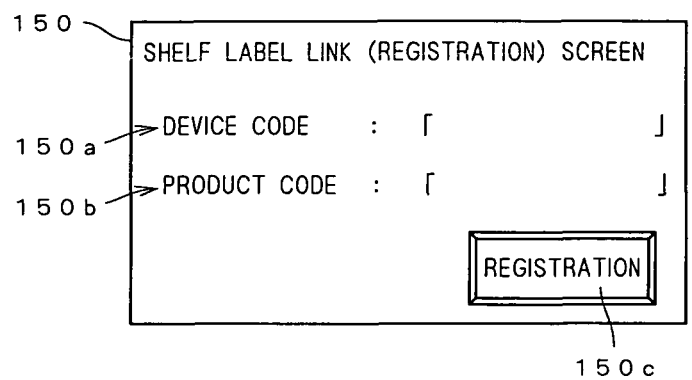
FIG. 11 is a view for illustrating a screen displayed in an associating process.

FIG. 11 is a view for illustrating a screen 150 displayed in the associating process.

The screen 150 includes a device code input section 150a for inputting a device code of the electronic shelf label 5 to be associated, a product code input section 150b for inputting a product code of the product 6 to be associated and a registration button 150c. Display of such a screen 150 helps an operator easily recognize that a device code and a product code should be input.

In the present first preferred embodiment, the above screen will be described as a screen (the screen 150 or the like) which is allowed to be displayed not only on the display part 15 of the ELS server 10, but also on the display part 75 of the handy scanner 7, for convenience of explanation. However, there is a case where a transportable device (the handy scanner 7) may be inferior to a stationary device (the ESL server 10) in its hardware performance. Therefore, if the display part 75 of the handy scanner 7 does not perform equally to the display part 15 of the ESL server 10, a screen displayed on the display part 15 may be different from a screen displayed on the display part 75.

Next, a product 6 and an electronic shelf label 5 which are associated with each other in the associating process are specified (a step S13). That is, when the screen 150 is displayed, an operator uses the bar code reader 17 and a worker uses the bar code reader 77, so as to read out a device code 5b of the electronic shelf label 5 located near a new product 6, in addition to read out a bar code (representing a product code) attached to (or printed on) the new product 6. It is noted that the electronic shelf label 5 according to the present first preferred embodiment would display the device code 5b on the display part 51 in an initial state where the electronic shelf label 5 is not associated with the product 6.

Figure 12:
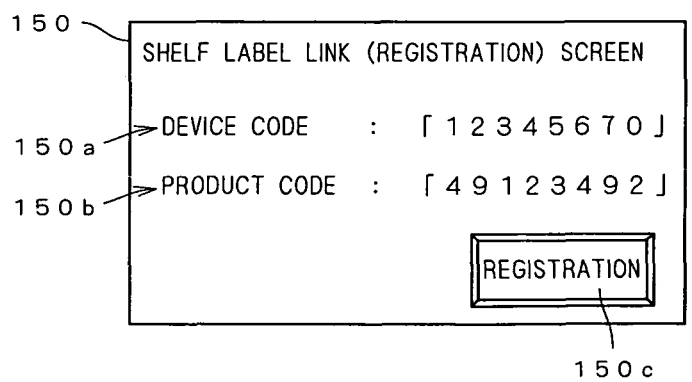
FIG. 12 is a view for illustrating a screen showing a state where a product and an electronic shelf label which are associated with each other in the associating process are specified by an input product code and an input device code.

FIG. 12 is a view for illustrating a state where a product 6 and an electronic shelf label 5 which are associated with each other in the associating process are specified by an input product code and an input device code. As illustrated in FIG. 12, the acquired device code "12345670" is displayed in the device code input section 150a of the screen 150, and the acquired product code "49123492" is displayed in the product code input section 150b of the screen 150. Therefore, an operator (or a worker) who performed the operation to read out a bar code can confirm that a product code of the product 6 and a device code of the electronic shelf label 5 are normally acquired by looking to the content of the screen 150.

If the product code and the device code are normally acquired, the operator (or the worker) instructs the associating process of the product 6 and the electronic shelf label 5 based on the acquired product code and device code by operating the registration button 150 displayed on the screen 150. This operation allows to generate product specification information 130 and device specification information 131 on the RAM 13 of the ESL server 10 to specify the product 6 and the electronic shelf label 5.

The step S13 shown in FIG. 9 is implemented, and next, the product 6 is associated with the electronic shelf label 5 by the electronic shelf label system 1 (a step S14).

In the step S14, the link part 110 acquires the product specification information 130 and the device specification information 131 which are generated in the step S13, and the product code and the device code included therein, respectively, are associated with each other to generate a single record 142 and register them in the link file 141.

FIG. 13 is a view for showing an example of the link file 141. FIG. 13 illustrates a state in which the associating process is implemented based on the device code and the product code shown in FIG. 12 with the link file 141 shown in FIG. 4 being memorized. It is clear from the comparison of FIGS. 4 and 13 that a new record 142f is additionally registered in the link file shown in FIG. 13. The record 142f stores the product code "49123492" and the device code "12345670" which are shown in FIG. 12, and they are logically associated with each other.

When the product 6 to be subjected to the associating process is specified, the electronic shelf label system 1 according to the present first preferred embodiment as in the above registers the product 6 in the link file 141 and implements the associating process without determining whether or not the product 6 is registered in the product master 140. Although details will be discussed subsequently, the record 143 once generated is not deleted later by the registration or the non-registration of the corresponding product 6 in the product master 140, and the associating process once implemented is not invalidated by the registration or the non-registration of the product 6 in the product master 140.

This allows an operator (or a worker) in a store to implement the associating process even on a product 6 which is not registered in the product master 140, preceding to the registration in the product master 140. Therefore, there is no need for stopping operations in a store until receiving the final instruction (until the final product master 140 is generated) from the head office, for example. In other words, the operator (or the worker) do not need to be aware of whether or not the product 6 has been already registered in the product master 140 when instructing the associating process.

The associating process is implemented in the step S14, and next, a second display process is implemented (a step S15). The second display process is a process to generate guiding information 133 of a product 6 newly associated in the step S14, and to display on the electronic shelf label 5 associated with the product 6.

As previously described in the first display process (the step S11), in the present first preferred embodiment, the guiding information 133 is not displayed regarding a product 6 (a product 6 which is not associated) which is not registered in the link file 141, even if the product 6 (a product offered for sale) is registered in the product master 140. This is because the electronic shelf label system 1 is not able to display the guiding information 133 at all since the electronic shelf label 5 for displaying the guiding information 133 is not specified with respect to the product 6 which is not registered in the link file 141. However, the product 6 which is not registered in the link file 141 is the product 6 which is still not instructed to display the guiding information 133 so that such a product 6 can be recognized as the product 6 which is determined that there is still no need for displaying the guiding information 133 by the operator (or the worker).

The electronic shelf label system 1 according to the present first preferred embodiment takes an instruction to register a product 6 in the link file 141 as an instruction to display the guiding information 133 of the product 6. Accordingly, whenever a product is newly associated with the electronic shelf label 5 (registration in the link file) by implementing the step S14, the second display process is always implemented for the product 6. As a result, all the products 6 registered in the link file 141 are displayed by implementing the second display process as well as the first display process implemented at every start-up. It is noted that the instruction to register a product 6 in the link file 141 may be determined as a different instruction from the instruction to display guiding information 133.

Figure 14:
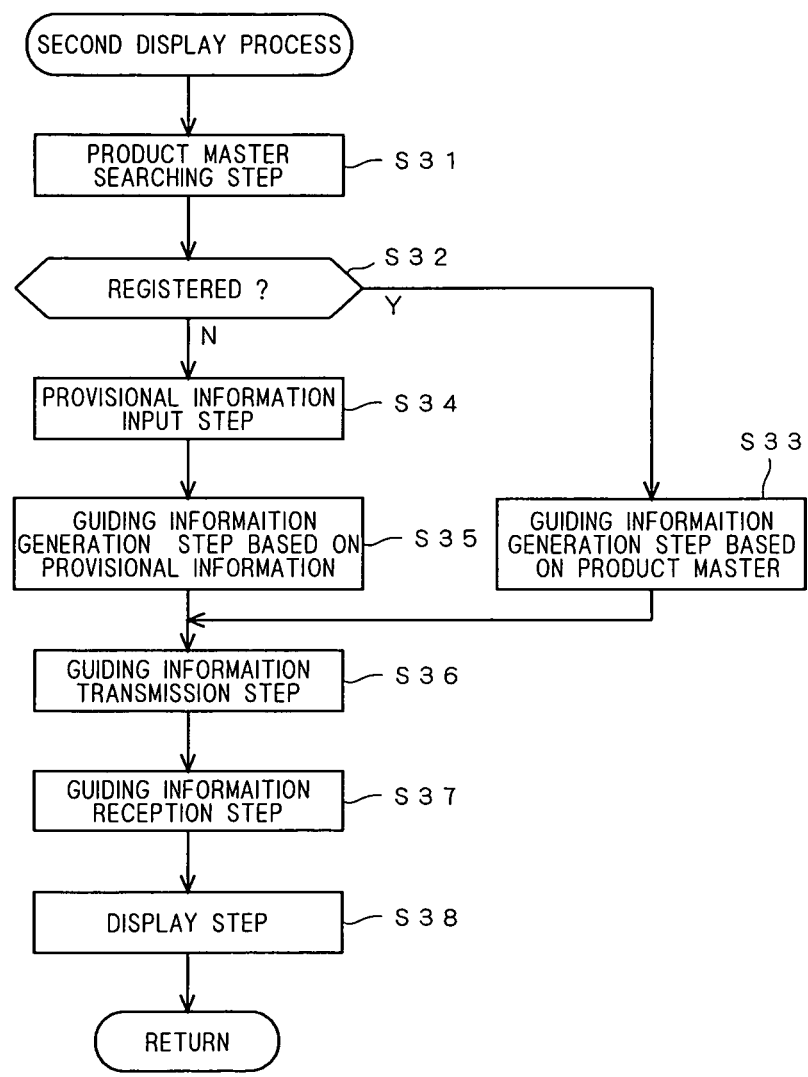
FIG. 14 is a flow chart for showing a second display process.

FIG. 14 is a flow chart for showing the second display process.

When the second display process is started, a product code of the product 6 newly associated in the step S14 is acquired by the generation part 112 acquiring product specification information 130. Then, the generation part 112 searches the product master 140 with the product code acquired from the product specification information 130 as a search key (a step S31).

Next, the product 6 designated by the product code is determined whether or not to be registered in the product master 140 based on the search result (whether or not the product code is stored in a single record of the product master 140) of the step S31 (a step S32).

When the product 6 is already registered in the product master 140 (the yes prong of the step S32), the generation part 112 acquires a single record of the product master 140 (a record regarding the product 6), and then generates guiding information 133 with the associated device code (a step S33).

The generation part 112 acquires a device code associated with the product code which is acquired form the product specification information 130 by referring to the link file 141 in the step S33. At the time of implementing the step S33, the step S14 is already implemented so that the product code is registered in the link file 141 by the link part 110. Therefore, the device code associated with the product code is inevitably found in the link file 141. It is noted that the generation part 112 may acquire the device code from the device specification information 131 in the step S33.

When a product 6 designated by the product code acquired form the product specification information 130 is still not registered in the product master 140 (the no prong of the step S32), the CPU 11 of the ESL server 10 prompts to input provisional information 132, and the electronic shelf label system 1 enters into a waiting state for input of provisional information 132.

Figure 15:
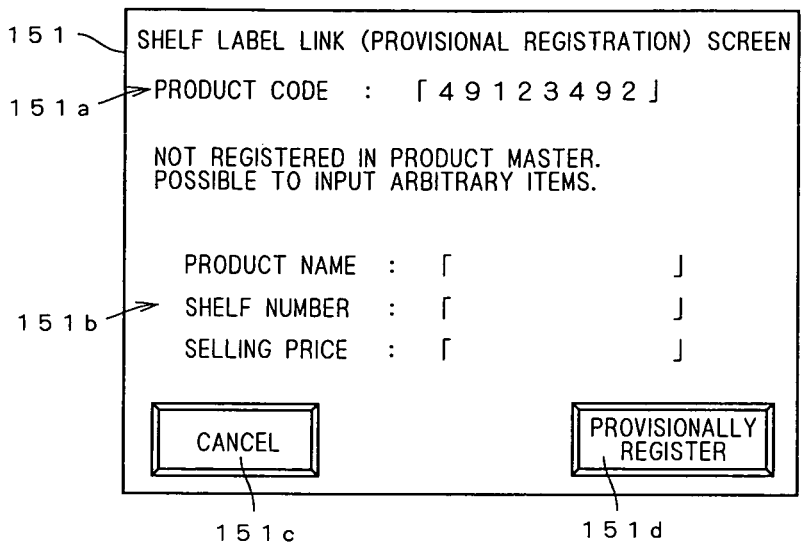
FIG. 15 is a view for illustrating a screen for prompting input of provisional information.

FIG. 15 is a view for illustrating a screen 151 for prompting input of the provisional information 132. FIG. 15 shows a case that even though the product 6 (product code) is registered in the link file 141 as shown in FIG. 13 according to the product code shown in FIG. 12 (acquired product code), the product 6 (product code) is not registered in the product master 140.

As shown in FIG. 15, the screen 151 provides and displays a product code input section 151a, a provisional information items input section 151b, a cancel button 151c and a provisional registration button 151d in addition to a message of "Not registered in product master. Possible to input arbitrary items."

A product code displayed in the product code input section 151a is a product code of the product 6 which is registered in the link file 141 by implementing the associating process in the step S14, and also a product code of the product 6 which is not registered in the product master 140.

The provisional information items input section 151b is a section for showing items of information which is possible to be input as provisional information 132. As shown in FIG. 15, it is possible to input a "product name", a "shelf number" and a "selling price" as the provisional information 132 in the present first preferred embodiment, but which is certainly not limited to those items. These items are arbitrary items so that a part of the items or all of the items may bet not input. It is noted that the "shelf number" is information to identify the face 61 of the shelf 60 where the product 6 is placed.

Such a screen 151 is displayed so that an operator or a worker would be aware that the product 6 which is instructed (specified) to associate in the step S13 is still not registered in the product master 140. Also, it can be easily confirmed which information of the product 6 which is not registered could be displayed as the guiding information 133.

Although details are not shown in FIG. 14, in a case where the associating process is desired to be canceled (the case where the associating process is not performed for a product which is not registered), an operator (or a worker) operates the cancel button 151c. With receipt of this operation, the electronic shelf label system 1 cancels generation of the provisional information 132 of the product 6 designated by the product code (also cancels generation and display of the guiding information 133), and also deletes the record 142 corresponding to the product code from the link file 141. That is, in the example shown in FIG. 15, when the cancel button 151c is operated, the record 142f is deleted from the link file 141 shown in FIG. 14 so that the associating process is invalidated. As described in the above, the electronic shelf label system 1 according to the present first preferred embodiment is configured to choose to maintain or cancel the associating process by an operator or a worker in a store voluntarily.

If the associating process is desired to be maintained, an operator (or a worker) inputs arbitrary items of the provisional information 132 according to the screen 151 (a step S34).

Figure 16:
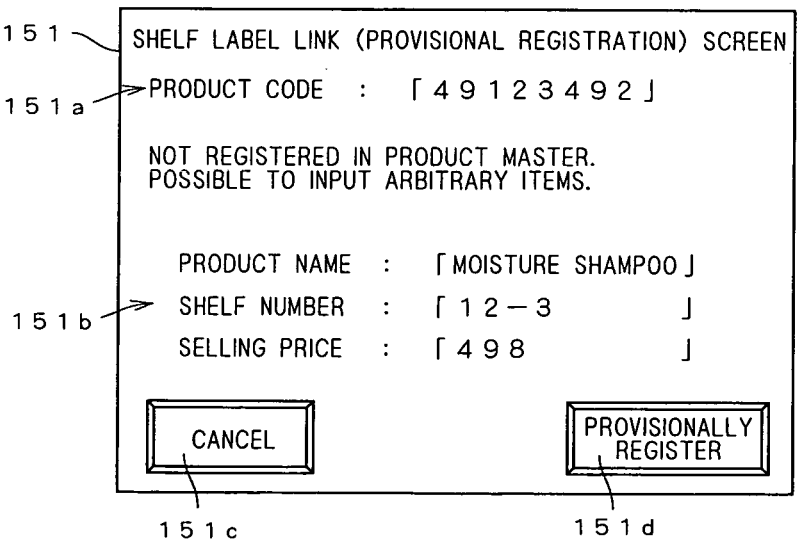
FIG. 16 is a view for illustrating a state where provisional information is input.

FIG. 16 is a view for illustrating a state where the provisional information 132 is input. As shown in FIG. 16, information which is input in the provisional information items input section 151b is displayed. An operator or a worker, thereby, can confirm whether the input information has an error.

When the input information has no errors, the provisional registration button 151d of the screen 151 is manipulated by operating the input part 16 or the input key 76. Then, after this operation is done, the provisional information 132 is generated in the RAM 13 based on the input information.

The provisional information 132 of the product 6 specified by the product specification information 130 is generated accordingly, and guiding information 133 is generated by the generation part 112 (a step S35).

The process of the step S35 will be described. First, the generation part 112 generates the guiding information 133 based on the product code included in the product specification information 130, identification information (provisional information identifier) for showing that the guiding information 133 is generated based on the provisional information 132, and information included in the provisional information 132. That is, the guiding information 133 generated in the step S35 includes the provisional information identifier for showing that the guiding information 133 is generated based on the provisional information 132.

The generation part 112 transmits the product code included in the product specification information 130, identification information (provisional information identifier) for showing that the guiding information 133 is generated based on the provisional information 132, and the provisional information 132 to the product master management part 111.

The product master management part 11 generates a new record of the product maser 140 based on the product code transmitted from the generation part 112, and stores the provisional information 132 transmitted as well and the provisional information identifier for showing that the guiding information 133 is generated based on the provisional information 132 in the record. That is, the product 6 designated by the product code (the product 6 determined not to be registered in the product master 140 in the step S32) is provisionally registered in the product master 140 to reflect the content of the provisional information 132 on the product master 140.

The record (the record of the product master 140) generated based on the provisional information 132 as described above includes the provisional information identifier for showing that accordingly. Therefore, products 6 which information of the final instruction is not acquired from the head office can be easily confirmed by displaying a list of products 6 having records which stores the provisional information identifier in subsequent processes.

Provisional registration in the product master 140 being ended, the product master management part 111 transmits a record which is provisionally registered as well as information for showing update of the product master 140 to the data communications part 18, which transmits them to the POS server 31. Then, the product master 301 of the POS system 3 is updated regarding the product 6 provisionally registered in the product master 140. The provisional information 132 in the present first preferred embodiment may include a "selling price" of the product 6, as shown in FIG. 16. In the store information system 100, even if it is based on the provisional information 132, for example, checkout procedures must be performed based on the selling price, as long as a selling price is displayed. Therefore, it is preferable to update the product master 301 of the POS system 3 which centralized controls selling prices of products 6 based on the provisional information 132.

The guiding information 133 of the product 6 is generated by implementing the steps S33 and S35, and subsequently, the steps S36 and S38 are implemented by the electronic shelf label system 1 so that the generated guiding information 133 is transmitted to the electronic shelf label 5 and displayed. Detail descriptions will be omitted for the steps S36 and S38, which are the similar processes as the steps S25 and S27 shown in FIG. 10, respectively.

FIG. 17 is a view for showing an example in which the guiding information 133 generated based on the provisional information 132 is displayed on the electronic shelf label 5. FIG. 17 illustrates a case where the provisional information 132 is generated based on information shown in FIG. 16, and the guiding information 133 is generated based on the provisional information 132.

As shown in FIG. 17, the display part 51 of the electronic shelf label 5 displays a product name "moisture shampoo", a shelf number "12-3" and a selling price "498", which are input as arbitrary items (the provisional information 132), as the product name 6a, the shelf number 6e and the selling price 6c, respectively. These are arbitrary items, which are not displayed if not included in the guiding information 133 (the provisional information 132). Also, a product code "49123492" included in the guiding information 133 is displayed on the display part 51 of the electronic shelf label 5 as the bar code 6b.

If the electronic shelf label system 1 according to the present first preferred embodiment as in the above is employed, the guiding information 133 generated based on the provisional information 132 is transmitted to the associated electronic shelf label 5 and displayed even for the product 6, which is still not registered in the product master 140, and for which regular information to be displayed is still not generated. Therefore, even if the associating process is performed for the product 6 not registered in the product master 140, the relation of the electronic shelf label 5 to the product 6 can be easily confirmed by looking to product specification information (the product name 6a, or the bar code 6b) displayed on the electronic shelf label 5.

As shown in FIG. 17, a provisional registration display 6d is displayed based on the provisional information identifier included in the guiding information 133. In the present first preferred embodiment, the provisional registration display 6d is fixedly displayed by the control part 53 determining whether or not it should be displayed by the presence or the absence of the provisional information identifier and making the display part 51 to display.

As described above, when the guiding information 133 includes the provisional information identifier, the display part 51 of the electronic shelf label 5 displays the provisional registration display 6d so that the display contents of the electronic shelf label 5 can be easily confirmed that they are based on the provisional information 132. That is, the product 6 can be easily confirmed that it is still provisionally registered in the product master 140, and does not receive an instruction from the head office, for example. The provisional registration display 6d includes the character string "provisional registration", which may be displayed in a way which can be confirmed only by an operator or a worker in a store.

Furthermore, as shown in FIG. 17, with display of the shelf number 6e, a worker doing the layout in a store can easily confirm to which position the electronic shelf label 5 should be attached. Also, the electronic shelf label 5 already attached can be confirmed if the attachment position is right. If the electronic shelf label 5 with the shelf number 6e displayed thereon is stored with the product 6 that is before lay out, the product 6 can be easily confirmed on which face 61 of the shelf 60 to be placed. That is, the associating process with the product 6 is performed, and the electronic shelf label 5 with the shelf number 6e displayed thereon can be used to display whereabouts of the product 6.

When display of the electronic shelf label 5 is completed by implementing the step S38 shown in FIG. 9, the second display process is finished, returning to a stand-by state.

When a process to update the product master 140 is instructed during stand-by, the electronic shelf label system 1 determines yes in the step S16. The cases to update the product master 140 include, for example, a case where the store controller 2 instructs to update the product master 140 with the final instruction (product master) transmitted from the head office, a case where update of the product master 301 updated in the POS server 31 is instructed to be reflected on the product master 140, a case where an operator of the ESL server 10 instructs by operating the input part 16, or the like. When update is instructed, a product code of a product 6 which is a target of update is instructed and transmitted to the product master management part 111.

When determined yes in the step S16, an update process is performed (a step S17). The update process according to the present first preferred embodiment is a process in which the product master management part 111 rewrites the product master 140 regarding the instructed product 6 in accordance with instruction, and details will be omitted.

Next, the product master management part 111 refers to the link file 141 according to a product code of the instructed product 6, and determines whether or not the product code (the product 6) is associated with a device code (an electronic shelf label 5) (a step S18).

In the present first preferred embodiment, guiding information 133 is not generated for the products 6 which are not registered in the link file 141, and the guiding information 133 of the products 6 are not displayed on the electronic shelf labels 5. That is, when determined no in the step S18, display of the electronic shelf label 5 does not need to be updated regarding the product 6 of which the product master 140 is updated in the step S17. Therefore, display process for the electronic shelf label 5 is not performed in this case, and the electronic shelf label system 1 returns to a stand-by state.

Meanwhile, in the present first preferred embodiment, guiding information 133 is generated for all the products 6 which are registered in the link file 141, and the guiding information 133 is displayed on the electronic shelf labels 5 in the steps S27 or S28. That is, when the product 6 of which the product master 140 is updated in the step S17 is registered in the link file 141, the guiding information 133 displayed on the electronic shelf label 5 at the time is information in the past, which needs to be updated.

As such, when determined yes in the step S18, the product master management part 111 transmits a product code of the product 6 to the generation part 112, and a third display process is implemented in the electronic shelf label system 1 (a step S19).

First, the generation part 112 searches the product master 140 with the product code transmitted from the product master management part 111 to acquire a corresponding single record. The step S17 is already performed at this point so that information stored in the acquired single record is the updated information.

Next, the generation part 112 acquires a device code associated with the product code from the link file 141 and generates guiding information 133 based on the device code and the single record acquired from the product master 140.

When the guiding information 133 is generated, the data communications part 18 transmits the newly generated guiding information 133 to the electronic shelf label 5 designated by the device code. The electronic shelf label 5 which has newly received the guiding information 133 displays the guiding information 133 which is newly received on the display part 51. Thereby, display based on the guiding information 133 received in the past is updated to display based on the newly received guiding information 133.

As described above, according to the electronic shelf label system 1 of the present first preferred embodiment, when the product master 140 is updated, display of the electronic shelf label 5 is automatically updated. Therefore, a burden of an operator or a worker can be reduced.

Displaying the new guiding information 133, the electronic shelf label system 1 returns to a stand-by state. Even during stand-by, the electronic shelf label system 1 observes whether or not completion is instructed (a step S20), and when completion is instructed, the electronic shelf label system 1 determines yes in the step S20 and terminates the process.

As described above, the associating process of the specified product 6 with the electronic shelf label 5 located near the product 6 is performed, whether or not the product 6 is registered in the product master 140. Thereby, the product 6 which is not registered in the product master 140 can be associated with the electronic shelf label 5, and there is no need to stop the associating process until the proper registration is done.

While the guiding information 133 of the product 6 is generated based on the product master 140 when the specified product 6 is registered in the product master 140, the guiding information 133 is generated based on the provisional information 132 received by the input part 16 when the product 6 is not registered in the product master 140, and thereby, the guiding information 133 can be displayed on the electronic shelf label 5 even for the product 6 which is not registered in the product master 140.

Therefore, display of products or the like in a store can be done in advance, for example, without waiting for the final product master 140 being acquired.

When the guiding information 133 of the product 6 is generated based on the received provisional information 132, the contents of the provisional information 132 is reflected on the memorized product master 140 regarding the product 6 to match information between the product master 140 and the provisional information 132 displayed on the electronic shelf label 5 as the guiding information 133.

The generation part 112 generates the guiding information 133 of the product 6 based on the product master 140 updated by the product master management part 111 when the product 6 which is a target of update is already associated with the electronic shelf label 5. Consequently, in a case where the product master 140 is updated, regarding a product which is already associated with any of the electronic shelf labels 5, display of the associated electronic shelf label 5 can be automatically changed based on the updated product master 140. Accordingly, there is no need for an operator to instruct to rewrite the guiding information 133 once again so that a burden of the operator can be reduced.

When the guiding information 133 is generated based on the provisional information 132, the guiding information 133 includes identification information for showing that the guiding information 133 is generated based on the provisional information 132, which is accordingly displayed on the electronic shelf label 5 as the guiding information 133 that it is based on the provisional information 132 (the provisional registration display 6d). Therefore, it can be easily confirmed that information displayed on the electronic shelf label 5 is not from the final product master 140 for the product 6.

While the present first preferred embodiment has been described in detail, however, the present invention is not limited to the foregoing preferred embodiment and numerous variations can be devised without departing from the scope of the invention.

For instance, each step described in the foregoing preferred embodiment is only an example, and not limited to its content and order as described in the above. Namely, its content and order may be appropriately modified only if the same effects or the like are obtained. For instance, it is described that the first display process according to the foregoing preferred embodiment is configured to sequentially refer to a single record 142 of the link file 141. However, the first display process may be configured to sequentially refer to a single record of the product master 140, and generate guiding information 133 by the generation part 112 only when a product code acquired from the single record of the product master 140 is registered in the link file 141.

It is also possible to configure to only perform the associating process with the link file 141 regarding a product 6 which is not registered in the product master 140, and not to provisionally register the product 6 in the product master 140. However, if it is configured like this, the product 6 is not registered (provisionally registered) in the product master 140 even when the step S23 is implemented, and thus a single record cannot be acquired from the product master 140. In such a case, the generation part 112 may generate guiding information 133 based on a product code and a device code, for example. The electronic shelf label 5, which receives the guiding information 133 including only such a product code, may display a message showing that the product designated by the product code is not registered in the product master 140.

In the foregoing preferred embodiment, data communication is performed between the handy scanner 7 and the ESL server 10 by radio communication, but may be performed by wire communication. For instance, a communications connector to connect the handy scanner 7 may be provided near the shelf 60 so that a worker may read out the bar code 5b (a device code) and the bar code 6b (a product code) in a selling floor.

Information displayed on the electronic shelf label 5 may not be limited to what the foregoing preferred embodiment describes. For instance, the "shelf number 6e" is described as information displayed regarding a product 6 provisionally registered, but it may be configured to display as well a product 6 which is regularly registered in the product master 140.

The functional block according to the foregoing preferred embodiment is described to be implemented by a CPU operating in accordance with a program. However it may not be necessarily limited to a configuration implemented as software, but a part or all of it may be configured with a dedicated logic circuit to be implemented as hardware.

Second Preferred Embodiment

In the above-described first preferred embodiment, when the CPU 11 of the ESL server 10 determines that a product 6 is not registered in the product master 140 in associating the product 6 with any of the electronic shelf labels 5 using the handy scanner 7 (the step S32), the handy scanner 7 displays the screen 151 for prompting input of the provisional information 132 (the step S34 and FIG. 11). This is based on the assumption that a two-way communication can be allowed between the data communications part 78 of the handy scanner 7 and the ESL server 10.

However, the data communications part 78 of the handy scanner 7 may be configured only to transmit data to the ESL server 10 and not to receive data from the ESL server 10. In this case, the handy scanner 7 cannot learn whether or not the product 6 which is a target of the associating process is registered in the product master 140 in the ELS server 10 so that the handy scanner 7 cannot display the screen 151 displayed only when the product 6 which is a target of the associating process is not registered in the product master 140. That is, the provisional information 132 cannot be input to the handy scanner 7. Therefore, the guiding information 133 including the provisional information 132 and the provisional information identifier cannot be transmitted from the ESL server 10 to the electronic shelf label 5 so that the electronic shelf label 5 cannot display the provisional registration display 6d as shown in FIG. 17. As a result, a worker cannot be aware at once that the product 6 which is a target of the associating process is not registered in the product master 140 in a selling floor of a store where products 6 and electronic shelf labels 5 are placed.

Consequently, the present second preferred embodiment will be discussed with reference to the electronic shelf label system 1 where a worker can be notified, in a selling floor of a store where products 6 and electronic shelf labels 5 are placed, that a product 6 which is a target of the associating process is not registered in the product master 140 when associating the product 6 with any of the electronic shelf labels 5 using the handy scanner 7 which is a transportable information processing device. Hereinafter, the electronic shelf label system 1 according to the present second preferred embodiment will be described, focusing on differences with the electronic shelf label system 1 according to the first preferred embodiment.

FIG. 18 is a flow chart for showing operations of the electronic shelf label system 1 according to the present second preferred embodiment in the associating process (the associating process after installation) using the handy scanner 7.

First, a worker specifies a product 6 and an electronic shelf label 5 which are associated with each other in the associating process using the handy scanner 7 (a step S51). In the step S51, the worker performs a predetermined operation on the input key 76 of the handy scanner 7 to display the screen 150 shown in FIG. 11 described above on the display part 75. Then, the worker reads out a bar code (representing a product code) attached to (or printed on) the product 6 which is a target of the associating process, and at the same time reads out the device code 5b of the electronic shelf label 5 located near the product 6. As a result, the display part 75 displays the screen 150 shown in FIG. 12 described above.

If the product code and the device code are normally acquired, the worker instructs to perform the associating process of the product 6 and the electronic shelf label 5 based on the acquired product code and device code by operating the registration button 150c displayed on the screen 150. By this operation, the product code and the device code which are input to the handy scanner 7 are transmitted from the data communications part 78 of the handy scanner 7 to the ESL server 10 to generate the product specification information 130 ant the device specification information 131 in the RAM 13 of the ESL server 10.

The ESL server 10 acquires the product code of the product 6 which is a target of the associating process by the generation part 112 acquiring the product specification information 130. The generation part 112 searches the product master 140 with the acquired product code as a searching key (a step S52).

Next, the generation part 112 determines whether or not the product 6 designated by the acquired product code, i.e. the product 6 which is a target of the associating process, is registered in the product master 140 based on the searching result of the step S52 (a step S53).

When the generation part 112 determines whether or not the product 6 which is a target of the associating process is already registered in the product master 140, the link part 110 acquires the product specification information 130 and the device specification information 131 in the RAM 13, generates a single record 142 by associating the product code and the device code which are included therein and registers the record 142 in the link file 141. Thereby, the product 6 which is a target of the associating process is associated with the electronic shelf label 5 located nearby (a step S54).

When the product 6 which is a target of the associating process is associated with the electronic shelf label 5 located nearby in the link part 110, the generation part 112 acquires a single record regarding the product 6 in the product master 140. Then, the generation part 112 generates the guiding information 133 based on the acquired single record and the device code of the electronic shelf label 5 associated with the product 6 (a step S55).

When the guiding information 133 is generated in the generation part 112, the data communications part 18 refers to the guiding information 133 to transmit the guiding information 133 toward the electronic shelf label 5 designated by the device code in accordance with the device code included in the guiding information 133 (a step S56).

When the guiding information 133 transmitted in the step S56 is received by the corresponding electronic shelf label 5 (a step S57), the electronic shelf label 5 appropriately displays information included in the received guiding information 133 on the display part 51 (a step S58).

Meanwhile, when the product 6 which is a target of the associating process is determined not to be registered in the product master 140 in the step S53, the generation part 112 generates non-registration notifying information for notifying that the product 6 is not registered in the product master 140 (a step S59). When the non-registration notifying information is generated in the generation part 112, the data communications part 18 transmits the non-registration notifying information in accordance with the device code shown by the device specification information 131 in the RAM 13 towards the electronic shelf label 5 designated by the device code (a step S60).

When the non-registration notifying information transmitted in the step S60 is received by the corresponding electronic shelf label 5 (a step S61), the control part 53 of the electronic shelf label 5 displays on the display part 51 that the product 6 which is a target of the associating process and is specified by the handy scanner 7 is not registered in the product master 140 (a step S62).

Figure 19:
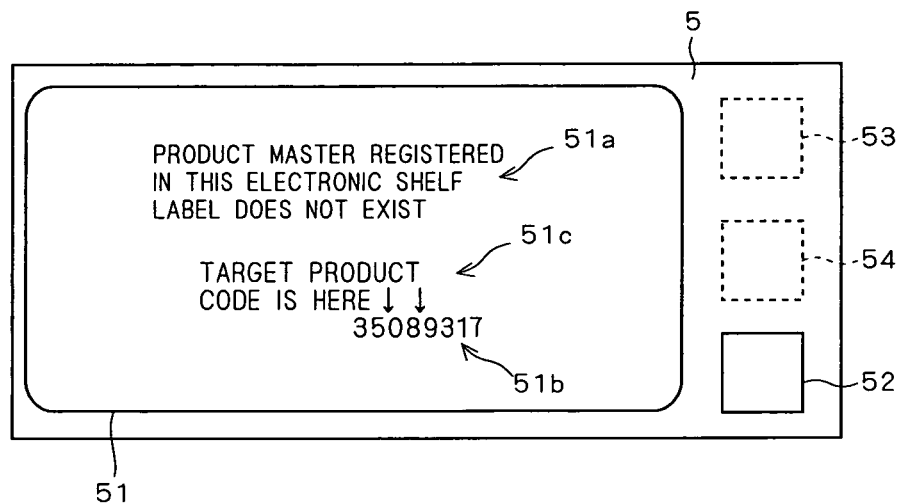
FIG. 19 is a view for showing one example of a state displaying that a product which is a target of the associating process is not registered in a product master in an electronic shelf label according to the second preferred embodiment of the present invention.
Figure 20:
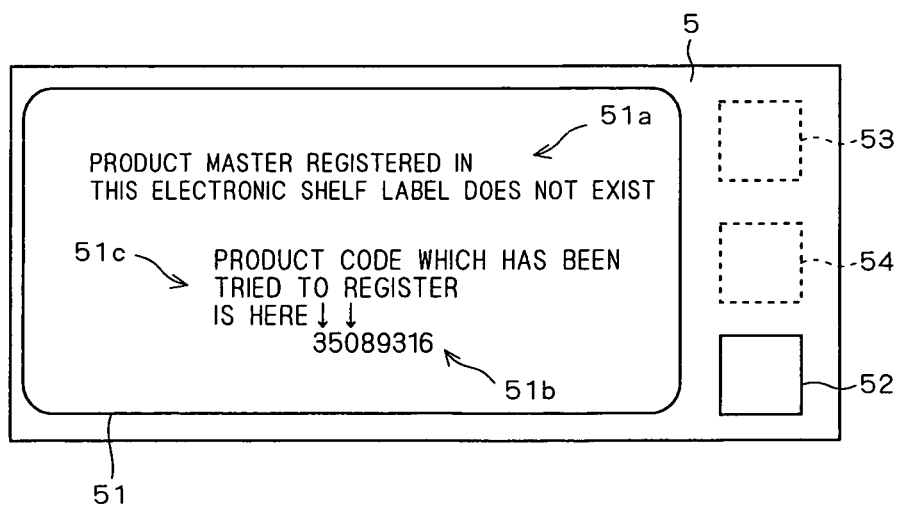
FIG. 20 is a view for showing another example of a state displaying that a product which is a target of the associating process is not registered in the product master in the electronic shelf label according to the second preferred embodiment of the present invention.

FIG. 19 is a view for showing one example of a state displaying in the electronic shelf label 5 that the product 6 which is a target of the associating process is not registered in the product master 140, and FIG. 20 is a view for showing another example of the above state. A character string 51a for illustrating that the product 6 which is a target of the associating process is not registered in the product master 140 is displayed on the display part 51 in the examples of FIGS. 19 and 20. Further, the display part 51 displays a character string 51b showing the product code of the product 6 in number and information 51c illustrating that the character string 51b represents the product code of the product 6 which is a target of the associating process.

Although it is displayed by the character strings in FIGS. 19 and 20 that the product 6 which is a target of the associating process is not registered in the product master 140, it may be displayed in symbols, and graphics, or combination of characters, symbols and graphics. Alternatively, it may be displayed in a manner where only a worker can be aware that the product 6 which is a target of the associating process is not registered in the product master 140.

As stated above, according to the electronic shelf label system 1 of the present second preferred embodiment, when the product 6 is not registered in the product master 140 in a case where the product 6 and the electronic shelf label 5 which are associated with each other are specified by the transportable handy scanner 7, the electronic shelf label 5 located near the product 6 displays that accordingly. Therefore, when a worker specifies the product 6 and the electronic shelf label 5 which are associated with each other using the handy scanner 7 in a floor of a store where the product 6 and the electronic shelf label 5 are placed, the worker can be notified that the product 6 is not registered in the product master 140. Accordingly, the worker can update the product master by his/her own, and prompt the head office that manages each store to update the product master 140. Thus, the product master 140 can be updated immediately.

The worker who tries to associate the product 6 with the electronic shelf label 5 using the handy scanner 7 specifies the product 6 and the electronic shelf label 5 using once again the handy scanner 7 when the product master 140 is updated by the head office or the like and registered in the product master 140. In this case, on the assumption that the product 6 specified by the handy scanner 7 is determined in the step S53 to be registered in the product master 140, the steps S54 to S58 are implemented and information such as a selling price of the product 6 or the like will be displayed on the electronic shelf label 5 specified by the handy scanner 7.

It is effective to display on the electronic shelf label 5 that the product 6 specified by the handy scanner 7 is not registered in the product master 140 especially when the handy scanner 7 can only transmit to the ESL server 10, but also it may be displayed when a two-way communication is allowed between the handy scanner 7 and the ESL server 10.

In the above example, when the product 6 which is a target of the associating process is not registered in the product master 140, the product 6 is not associated with the electronic shelf label 5 located nearby, but may be associated with each other. In this case, the step S54 is implemented just before the step S59 to generate a single record 142 of the link file 141 to associate a product code of the product 6 with a device code of the electronic shelf label 5.

As described above, even when the product 6 specified by the handy scanner 7 is not registered in the product master 140, the product 6 is associated with the electronic shelf label 5 located near the product 6, so that the product 6 can be associated with the electronic shelf label 5 without waiting for update of the product master 140 as well as the first preferred embodiment. Thus, working efficiency can be enhanced.

Also, in associating the product 6 with the electronic shelf label 5 when the product 6 specified by the handy scanner 7 is not registered in the product master 140, the product master 140 is updated and information such as a selling price of the product 6 or the like is registered in the product master 140, so that information regarding the product 6 can be automatically displayed on the electronic shelf label 5 located nearby similarly to the above-described steps S16 to S19 and display of the electronic shelf label 5 can be automatically updated. This is possible because the product 6 is already associated with the electronic shelf label 5 at the time when the product 6 is registered in the product master 140, and a device code of the electronic shelf label 5 can be acquired by referring to the link file 141.

Moreover, in associating the product 6 with the electronic shelf label 5 when the product 6 specified by the handy scanner 7 is not registered in the product master 140, the product 6 may be provisionally registered in the product master 140 by adding a single record including only a product code of the product 6 to the product master 140. In this case, a single record including only a product code of the product 6 is also added to the product master 301 in the POS server 31. That is, the product 6 is provisionally registered in the product master 301 as well.

In the POS system 3, when the product 6 is not registered in the product master 301, i.e. when a single record including information of the product 6 does not exist in the product master 301, any information of the product 6 cannot be acquired in the cash register 32 for performing a checkout procedure of the product 6, causing an error to be unable to check out.

As described above, even when the product 6 which is a target of the associating process is not registered in the product master 140, a product code of the product 6 can be acquired at checkout of the product 6 in the cash register 32 of the POS system 3 by adding a single record including only the product code of the product 6 to the product masters 140 and 301. Therefore, the checkout procedure can be performed on the product 6 by manually inputting a selling price or a product name of the product 6 by a worker.

The CPU 11 of the ESL server 10 refers to records including only product codes in the product master 140, so that the display part 15 can display a list of product codes of products 6 which are not regularly registered in the product master 140.

While the invention has been shown and described in detail, the foregoing description is in all aspects illustrative and not restrictive. It is therefore understood that numerous modifications and variations can be devised without departing from the scope of the invention.

The invention claimed is:

1. An electronic shelf label system including electronic shelf labels located near products and a server for transmitting guiding information of said products to said electronic shelf labels, comprising:
  a storage part, included in said server, memorizing a product master which stores information regarding registered products,
  an input part accepting provisional information,
  a specifying part specifying a product and an electronic shelf label located near said product by acquiring a product code for said product and a device code for said electronic shelf,
  a link part, included in said server, associating a product specified by said specifying part with an electronic shelf label located near said product by generating link information associating said product code and said device code acquired by said specifying part with each other,
  a generation part, included in said server, generating guiding information of a product specified by said specifying part based on provisional information accepted by said input part when said product is not registered in a product master memorized in said storage part, while generating guiding information of said product based on said product master when said product is registered in said product master, and
  a transmission part transmitting guiding information of a product to an electronic shelf label associated with said product in the link information including the product code of said product, when guiding information of said product is generated, wherein
  an electronic shelf label which has received guiding information from said transmission part displays said guiding information,
  when guiding information of a product is generated by said generation part based on provisional information accepted by said input part, the contents of said provisional information are reflected to the product master memorized in said storage part, regarding said product, and
  when generating guiding information based on provisional information, said generation part includes identification information in said guiding information, said identification information showing that said guiding information is generated based on said provisional information.

2. The electronic shelf label system according to claim 1, further comprising:
  an update part for updating a product master memorized in said storage part regarding a product which is a target of update, wherein
  when a product which is a target of update has been already associated with any of electronic shelf labels, said generation part generates guiding information of said product based on a product master updated by said update part.

3. An electronic shelf label system including electronic shelf labels located near products and a server for transmitting guiding information of said products to said electronic shelf labels, comprising:
- a transportable information processing device including a specifying part specifying a product and an electronic shelf label located near said product by acquiring a product code for said product and a device code for said electronic shelf,
- a storage part, included in said server, memorizing a product master which stores information regarding registered products,
- a link part, included in said server, associating a product specified by said specifying part with an electronic shelf label located near said product by generating link information associating said product code and said device code acquired by said specifying part with each other when said product is registered in said product master,
- a generation part, included in said server, generating non-registration notifying information for notifying that a product specified by said specifying part is not registered in said product master when said product is not registered in said product master, while generating guiding information of a product specified by said specifying part based on said product master when said product is registered in said product master, and
- a transmission part for transmitting non-registration notifying information of a product to an electronic shelf label located near said product when non-registration notifying information of said product is generated, while transmitting guiding information of a product to an electronic shelf label associated with said product in the link information including the product code of said product when guiding information of said product is generated, wherein
- an electronic shelf label which has received guiding information of a product from said transmission part displays said guiding information,
- an electronic shelf label which has received non-registration notifying information regarding a product from said transmission part displays that said product is not registered in said product master, and
- when generating non-registration notifying information, said generation part includes identification information in said non-registration notifying information, said identification information showing that said non-registration notifying information is for notifying that a product specified by said specifying part is not registered in said product master.

4. An electronic shelf label system including electronic shelf labels located near products and a server for transmitting guiding information of said products to said electronic shelf labels, comprising:
- a transportable information processing device including a specifying part specifying a product and an electronic shelf label located near said product by acquiring a product code for said product and a device code for said electronic shelf,
- a storage part, included in said server, memorizing a product master which stores information regarding registered products,
- a link part, included in said server, associating a product specified by said specifying part with an electronic shelf label located near said product by generating link information associating said product code and said device code acquired by said specifying part with each other when said product is registered in said product master,
- a generation part, included in said server, generating non-registration notifying information for notifying that a product specified by said specifying part is not registered in said product master when said product is not registered in said product master, while generating guiding information of a product specified by said specifying part based on said product master when said product is registered in said product master, and
- a transmission part for transmitting non-registration notifying information of a product to an electronic shelf label located near said product when non-registration notifying information of said product is generated, while transmitting guiding information of a product to an electronic shelf label associated with said product in the link information including the product code of said product when guiding information of said product is generated, wherein
- an electronic shelf label which has received guiding information of a product from said transmission part displays said guiding information,
- an electronic shelf label which has received non-registration notifying information regarding a product from said transmission part displays that said product is not registered in said product master, and
- even when a product specified by said specifying part is not registered in said product master, said link part associates said product with an electronic shelf label located near said product by generating link information associating a product code of said product with a device code of said electronic shelf label.

* * * * *

UNITED STATES PATENT AND TRADEMARK OFFICE
CERTIFICATE OF CORRECTION

PATENT NO. : 8,556,172 B2  
APPLICATION NO. : 12/448407  
DATED : October 15, 2013  
INVENTOR(S) : Kazutomo Nakamura Page 1 of 1

It is certified that error appears in the above-identified patent and that said Letters Patent is hereby corrected as shown below:

In the Drawings  
On Sheet 8 of 15 (Reference Numeral S24) (FIG. 10), Line 1, Delete "INFORMAITION" and insert -- INFORMATION --, therefor.  
On Sheet 8 of 15 (Reference Numeral S25) (FIG. 10), Line 1, Delete "INFORMAITION" and insert -- INFORMATION --, therefor.  
On Sheet 8 of 15 (Reference Numeral S26) (FIG. 10), Line 1, Delete "INFORMAITION" and insert -- INFORMATION --, therefor.  
On Sheet 11 of 15 (Reference Numeral S33) (FIG. 14), Line 1, Delete "INFORMAITION" and insert -- INFORMATION --, therefor.  
On Sheet 11 of 15 (Reference Numeral S35) (FIG. 14), Line 1, Delete "INFORMAITION" and insert -- INFORMATION --, therefor.  
On Sheet 11 of 15 (Reference Numeral S36) (FIG. 14), Line 1, Delete "INFORMAITION" and insert -- INFORMATION --, therefor.  
On Sheet 11 of 15 (Reference Numeral S37) (FIG. 14), Line 1, Delete "INFORMAITION" and insert -- INFORMATION --, therefor.  
On Sheet 14 of 15 (Reference Numeral S55) (FIG. 18), Line 1, Delete "INFORMAITION" and insert -- INFORMATION --, therefor.  
On Sheet 14 of 15 (Reference Numeral S56) (FIG. 18), Line 1, Delete "INFORMAITION" and insert -- INFORMATION --, therefor.  
On Sheet 14 of 15 (Reference Numeral S57) (FIG. 18), Line 1, Delete "INFORMAITION" and insert -- INFORMATION --, therefor.

In the Specifications  
In Column 14, Line 31, Delete "ELS" and insert -- ESL --, therefor.  
In Column 22, Line 50, Delete "ELS" and insert -- ESL --, therefor.

Signed and Sealed this  
Twenty-eighth Day of January, 2014

Michelle K. Lee  
*Deputy Director of the United States Patent and Trademark Office*